(12) United States Patent
Nako et al.

(10) Patent No.: US 9,879,335 B2
(45) Date of Patent: Jan. 30, 2018

(54) WELD METAL AND WELDED STRUCTURE

(71) Applicant: KOBE STEEL, LTD., Kobe-shi (JP)

(72) Inventors: Hidenori Nako, Kobe (JP); Ken Yamashita, Fujisawa (JP); Minoru Otsu, Fujisawa (JP); Mikihiro Sakata, Fujisawa (JP); Genichi Taniguchi, Fujisawa (JP)

(73) Assignee: Kobe Steel, Ltd., Kobe-shi (JP)

( * ) Notice: Subject to any disclaimer, the term of this patent is extended or adjusted under 35 U.S.C. 154(b) by 45 days.

(21) Appl. No.: 14/655,412

(22) PCT Filed: Feb. 3, 2014

(86) PCT No.: PCT/JP2014/052452
§ 371 (c)(1),
(2) Date: Jun. 25, 2015

(87) PCT Pub. No.: WO2014/119785
PCT Pub. Date: Jul. 8, 2014

(65) Prior Publication Data
US 2016/0002758 A1    Jan. 7, 2016

(30) Foreign Application Priority Data
Feb. 4, 2013 (JP) .................................. 2013-019560

(51) Int. Cl.
*C22C 38/54* (2006.01)
*B23K 35/36* (2006.01)
(Continued)

(52) U.S. Cl.
CPC ............ *C22C 38/54* (2013.01); *B23K 35/308* (2013.01); *B23K 35/3602* (2013.01);
(Continued)

(58) Field of Classification Search
CPC .................................................... B23K 35/308
(Continued)

(56) References Cited

U.S. PATENT DOCUMENTS 5,945,064 A * 8/1999 Komai ................. B23K 35/308
420/106
2006/0176674 A1* 8/2006 Hoffmann ............... H01G 4/232
361/768
(Continued)

FOREIGN PATENT DOCUMENTS

EP    2 610 029 A1    7/2013
FR    2 740 715 A1    5/1997
(Continued)

OTHER PUBLICATIONS

Extended European Search Report dated on Jun. 2, 2016 in Patent Application No. 14745350.0.

*Primary Examiner* — Colleen Dunn
*Assistant Examiner* — Jeremy Jones
(74) *Attorney, Agent, or Firm* — Oblon, McClelland, Maier & Neustadt, L.L.P.

(57) ABSTRACT

This welded structure comprises a weld metal which contains C, Si, Mn, Cr, Mo, V, Nb, N and O in prescribed amounts respectively with the balance being Fe and unavoidable impurities and which exhibits an A value of 200 or more and a Z value of 0.05 or more. The A value is calculated from the element contents of the weld metal according to the formula: A value=$([V]/51+[Nb]/93)/\{[V]\times([Cr]/5+[Mo]/2)\}\times 10^4$. The Z value is calculated according to the formula: Z value=$N\times[\text{insol. V}]$ [wherein N (particles/μm) is the number density of carbide particles present in a prior austenite grain boundary per unit grain boundary in the stress-relief annealed weld metal, and [insol. V] is the concentration of compound-type V as determined by ana-
(Continued)

lyzing an extraction residue of the stress-relief annealed weld metal].

18 Claims, 5 Drawing Sheets

(51) Int. Cl.
| | |
|---|---|
| C22C 38/00 | (2006.01) |
| B23K 35/30 | (2006.01) |
| C22C 38/02 | (2006.01) |
| C22C 38/04 | (2006.01) |
| C22C 38/20 | (2006.01) |
| C22C 38/22 | (2006.01) |
| C22C 38/24 | (2006.01) |
| C22C 38/26 | (2006.01) |
| C22C 38/32 | (2006.01) |
| C22C 38/06 | (2006.01) |
| C22C 38/42 | (2006.01) |
| C22C 38/44 | (2006.01) |
| C22C 38/46 | (2006.01) |
| C22C 38/48 | (2006.01) |
| C22C 38/50 | (2006.01) |

(52) U.S. Cl.
CPC ........ *B23K 35/3605* (2013.01); *C22C 38/001* (2013.01); *C22C 38/002* (2013.01); *C22C 38/02* (2013.01); *C22C 38/04* (2013.01); *C22C 38/06* (2013.01); *C22C 38/20* (2013.01); *C22C 38/22* (2013.01); *C22C 38/24* (2013.01); *C22C 38/26* (2013.01); *C22C 38/32* (2013.01); *C22C 38/42* (2013.01); *C22C 38/44* (2013.01); *C22C 38/46* (2013.01); *C22C 38/48* (2013.01); *C22C 38/50* (2013.01)

(58) Field of Classification Search
USPC .......................................................... 420/91
See application file for complete search history.

(56) References Cited

U.S. PATENT DOCUMENTS

| | | | | |
|---|---|---|---|---|
| 2008/0199346 A1* | 8/2008 | Okazaki | ............... | B23K 35/308 420/106 |
| 2013/0309003 A1 | 11/2013 | Nako et al. | | |
| 2013/0315661 A1 | 11/2013 | Nako et al. | | |

FOREIGN PATENT DOCUMENTS

| | | | |
|---|---|---|---|
| JP | 2-182378 | | 7/1990 |
| JP | 8-150478 | | 6/1996 |
| JP | 09192881 A | * | 7/1997 |
| JP | 10-137975 A | | 5/1998 |
| JP | 2000-301378 A | | 10/2000 |
| JP | 2008-229718 A | | 10/2008 |
| JP | 2009-106949 A | | 5/2009 |
| JP | 2012-110932 A | | 6/2012 |
| JP | 2012-166203 A | | 9/2012 |
| JP | 2012-187619 A | | 10/2012 |
| WO | 2012/070524 A1 | | 5/2012 |
| WO | 2012/108517 A1 | | 8/2012 |
| WO | 2012/124529 A1 | | 9/2012 |
| WO | 2013/077356 A1 | | 5/2013 |

\* cited by examiner

CARBIDE PARTICLE HAVING CIRCLE-EQUIVALENT DIAMETER OF LESS THAN 0.40 μm

CARBIDE PARTICLE HAVING CIRCLE-EQUIVALENT DIAMETER OF 0.40 μm OR MORE

WHEN LESS THAN THREE CARBIDE PARTICLES, EACH HAVING A CIRCLE-EQUIVALENT DIAMETER OF 0.40 μm OR MORE, INTERSECT WITH A STRAIGHT LINE, SUCH A STRAIGHT LINE IS NOT DRAWN

※ANY OF STRAIGHT LINES A1 TO A8 HAS A LENGTH OF 6 μm

T: THICKNESS

T: THICKNESS

WELD METAL AND WELDED STRUCTURE

TECHNICAL FIELD

The present invention relates to a weld metal used under environment of high temperature and pressure, such as environment in a boiler or a chemical reaction container, and a welded structure including the weld metal.

BACKGROUND ART

High-strength Cr-Mo steel and a weld metal thereof used under environment of high temperature and pressure, such as environment in a boiler or a chemical reaction container, are each required to have, at the same time, high strength, high toughness, good creep rupture properties, high SR crack resistance, which ensures no grain boundary cracking during stress relief annealing, and high temper embrittlement resistance, which ensures less embrittlement while in use under high-temperature environment. In particular, material thickness is recently increased along with increased size of equipment, and thus welding heat input gradually increases from the viewpoint of working efficiency. Such increased welding heat input in general coarsens a microstructure of the weld metal, and degrades toughness (or temper embrittlement resistance). Hence, higher toughness and/or temper embrittlement resistance are currently required. Operation condition of such equipment is intentionally increased in temperature and pressure from the viewpoint of high-efficiency operation. The weld metal is also required to be improved in creep rupture properties.

The following approaches have been reported as investigations focusing on toughness and/or temper embrittlement resistances of a weld metal of high-strength Cr—Mo steel.

For example, in PTL 1, a steel sheet composition, a welding material composition, and a welding condition are regulated in detail so that the weld metal has creep strength, toughness, and hydrogen crack resistance at the same time. For example, in PTL 2, a weld metal good in toughness, strength, temper embrittlement resistance, and SR crack resistance is achieved through regulating a composition of each of a wire and bond flux in detail and controlling a welding condition.

For example, in PTL 3, a composition of a weld metal, particularly the content of each impurity element, is controlled to improve toughness, strength, and SR crack resistance of the weld metal. For example, in PTL 4, toughness, strength, and the like of a weld metal is improved by controlling a composition of each of a core wire and a coating material of a welding rod for shielded metal arc welding. For example, in PTL 5, toughness, temper embrittlement resistance, and the like are improved by controlling a composition of each of a wire and bonded flux for submerge arc welding.

For example, in PTL 6, a carbide form at a grain boundary is controlled, and Ostwald ripening of fine carbide particles is inhibited during a creep test, thereby good creep rupture properties of a weld metal are achieved. For example, in PTL 7, it is found that fine $Mo_2C$ particles precipitated during temper embrittlement treatment prompt temper embrittlement, and temper embrittlement resistance is improved by suppressing precipitation of such $Mo_2C$ particles.

CITATION LIST

Patent Literature

PTL 1: Japanese Unexamined Patent Application Publication No. Hei02(1990)-182378

PTL 2: Japanese Unexamined Patent Application Publication No. Hei08(1996)-150478

PTL 3: Japanese Unexamined Patent Application Publication No. 2000-301378

PTL 4: Japanese Unexamined Patent Application Publication No. 2008-229718

PTL 5: Japanese Unexamined Patent Application Publication No. 2009-106949

PTL 6: Japanese Unexamined Patent Application Publication No. 2012-166203

PTL 7: Japanese Unexamined Patent Application Publication No. 2012-187619

SUMMARY OF INVENTION

Technical Problem

However, such existing techniques have the following problems.

In PTL 1, some examples show good $vTr_{5.5}$ (temperature at which absorbed energy after stress relief annealing (hereinafter, referred to as "SR annealing") is 5.5 kgf·m) of −50° C., the $vTr_{5.5}$ indicating toughness after SR annealing. However, $vTr'_{5.5}$ (temperature at which absorbed energy after step cooling is 5.5 kgf·m), which indicates toughness after temper embrittlement treatment (step cooling), is not at a sufficient level, i.e., −41° C. at the lowest. In addition, an assumed creep rupture properties are not at a sufficient level, i.e., about 240 MPa at condition of 550° C.×800 hours. Furthermore, holding time in a SR annealing is short, 26 hours at the longest, which is a condition allowing high creep rupture properties to be easily exhibited. Alternatively, this technique requires a complicated process such as two times of SR annealing.

In some examples of PTL 2, $vTr_{55}$ (temperature at which absorbed energy after SR annealing is 55 J) indicating toughness after SR annealing and $vTr'_{55}$ (temperature at which absorbed energy after step cooling is 55 J) indicating toughness after temper embrittlement treatment (step cooling) are each below −50° C., i.e., good toughness is exhibited. However, each example shows $\Delta vTr_{55}$ ($=vTr_{55}-vTr'_{55}$), which indicates a level of embrittlement at tempering, of 8° C. or higher, i.e., each example does not sufficiently suppress temper embrittlement. In addition, an assumed SR condition is 700° C.×26 hours, i.e., holding time is short, and thus creep rupture properties are not guaranteed under a more severe SR condition.

PTL 3 does not consider the temper embrittlement resistance. In addition, an assumed creep rupture properties are not at a sufficient level, i.e., 900 hours at a condition of 538° C.×206 MPa.

In PTL 4 and PTL 5, a weld metal has high toughness and high temper embrittlement resistance. However, the recommended welding condition does not sufficiently meet the trend towards increased welding heat input. Specifically, welding current is 140 to 190 A in PTL 4 that regulates a weld metal produced by shielded metal arc welding, and welding heat input is 2.0 to 3.6 kJ/mm in PTL 5 that regulates a weld metal produced by submerge arc welding. PTL 4 and PTL 5 each do not describe creep rupture properties.

PTL 6 does not consider temper embrittlement resistance. PTL 7 does not describe creep rupture properties.

An object of the invention, which has been made in light of such problems, is to provide a weld metal stably having temper embrittlement resistance, creep rupture properties, strength, toughness, and SR crack resistance even at a welding condition with large heat input.

Solution to Problem

After earnest investigations, the inventors have further investigated a technique that stably allows a weld metal to have temper embrittlement resistance, creep rupture properties, strength, toughness, and SR crack resistance even at a welding condition with relatively large heat input. The inventors have found that while V carbide is formed in a prior austenite grain boundary during welding or SR annealing, Ostwald ripening of fine MC carbide particles (M: carbide-forming element) is inhibited during a creep test, thereby the weld metal can have the above-described properties including temper embrittlement resistance and creep rupture properties at the same time, and the inventors have finally completed the invention.

Specifically, it has been found that a weld metal composition is controlled to be within a predetermined range, and an A value is adjusted to be 200 or more, the A value being obtained by the weld metal composition according to a formula $$A \text{ value} = ([V]/51 + [Nb]/93)/\{[V] \times ([Cr]/5 + [Mo]/2)\} \times 10^4.$$

In addition, it has been found that a Z value is controlled to be 0.05 or more, the Z value being determined by the number density N (particles/μm) of carbide particles per unit grain boundary, the carbide particles existing in a prior austenite grain boundary of stress-relief annealed weld metal, and the concentration of compound-type V [insol. V] of the stress-relief annealed weld metal, and obtained according to a formula $$Z \text{ value} = N \times [\text{insol. V}],$$

and thereby the weld metal can have the properties including temper embrittlement resistance and creep rupture properties at the same time.

In the formula of the A value, [V], [Nb], [Cr], and [Mo] represent the contents (mass %) of V, Nb, Cr, and Mo, respectively. In addition, "$10^4$" is multiplied to "$([V]/51+[Nb]/93)/\{[V] \times ([Cr]/5+[Mo]/2)\}$".

In this way, in the invention, since influence of the weld metal composition cannot be sufficiently understood only through the weld metal concentration of each element, the weld metal composition is regulated using the A value determined by the weld metal composition, and the Z value determined by the number density N (particles/μm) of carbide particles per unit grain boundary, the carbide particles existing in a prior austenite grain boundary, and the concentration of compound-type V [insol. V].

The weld metal according to the invention contains C: 0.05 to 0.15 mass %; Si: 0.10 to 0.50 mass %; Mn: 0.60 to 1.30 mass %; Cr: 1.80 to 3.00 mass %; Mo: 0.80 to 1.20 mass %; V: 0.25 to 0.50 mass %; Nb: 0.010 to 0.050 mass %; N: 0.025 mass % or less (not including 0 mass %); and O: 0.020 to 0.060 mass %, with the remainder consisting of Fe and inevitable impurities, in which an A value satisfies 200 or more, the A value being obtained by the weld metal composition according to a formula $$A \text{ value} = ([V]/51 + [Nb]/93)/\{[V] \times ([Cr]/5 + [Mo]/2)\} \times 10^4,$$

and in which a Z value is 0.05 or more, the Z value being obtained according to a formula $$Z \text{ value} = N \times [\text{insol. V}],$$

where N is number density (particles/μm) of carbide particles per unit grain boundary, the carbide particles existing in a grain boundary of a stress-relief annealed weld metal, and [insol. V] is concentration of compound-type V determined by an extraction residue of the stress-relief annealed weld metal.

According to such a configuration, a weld metal contains a predetermined amount of each predetermined component, and is thereby improved in strength, workability, creep rupture properties, temper embrittlement resistance, toughness, and SR crack resistance.

For the weld metal, the A value is adjusted to be equal to or larger than a predetermined value, so that the number of MC particles is controlled, resulting in improvement in creep rupture properties. In addition, for the weld metal, the Z value is adjusted to be equal to or larger than a predetermined value, so that the amount of V carbide at a grain boundary is regulated, resulting in improvement in creep rupture properties and in temper embrittlement resistance.

The weld metal according to the invention further contains one or both of Cu: 1.00 mass % or less (not including 0 mass %) and Ni: 1.00 mass % or less (not including 0 mass %).

According to such a configuration, the weld metal is further improved in toughness through containing a predetermined amount of one or both of Cu and Ni.

The weld metal according to the invention further contains B: 0.0050 mass % or less (not including 0 mass %).

According to such a configuration, the weld metal is further increased in strength through containing a predetermined amount of B.

The weld metal according to the invention further contains one or more of W: 0.50 mass % or less (not including 0 mass %), Al: 0.030 mass % or less (not including 0 mass %), and Ti: 0.020 mass % or less (not including 0 mass %).

According to such a configuration, the weld metal is further increased in strength by containing a predetermined amount of W and/or Ti, and is accelerated in deoxidation by containing a predetermined amount of Al.

A welded structure according to the invention includes one of the above-described weld metals.

According to such a configuration, the welded structure, including one of the above-described weld metals, has a weld bead stably having temper embrittlement resistance, creep rupture properties, strength, toughness, and SR crack resistance.

Advantageous Effects of Invention

The weld metal and the welded structure according to the invention can each stably have temper embrittlement resistance, creep rupture properties, strength, toughness, and SR crack resistance even at a welding condition with large heat input. This leads to improvement in reliability and durability of equipment used under environment of high temperature and pressure, such as a boiler and a chemical reaction container.

DESCRIPTION OF EMBODIMENTS

Figure 1A:
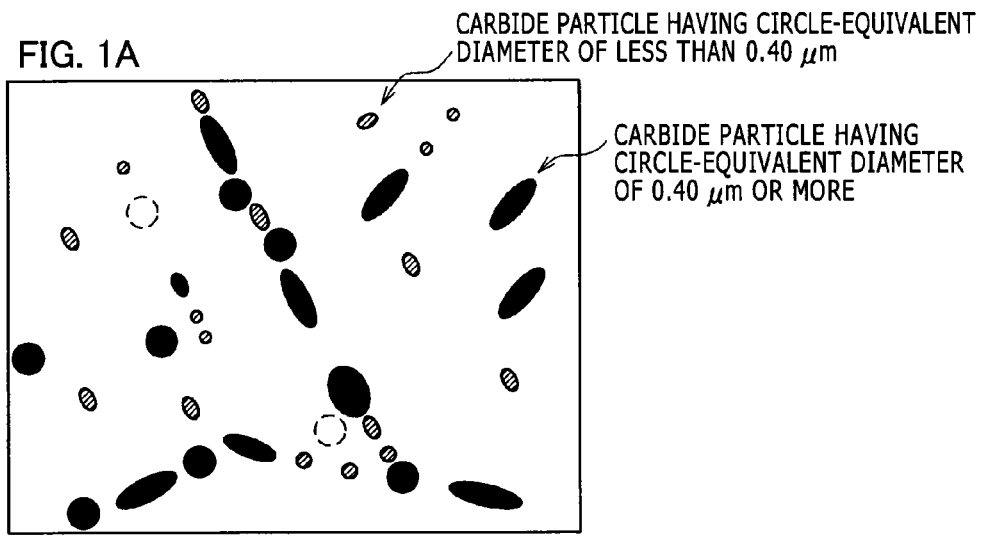
FIGS. 1A and 1B include conceptual diagrams for explaining a method of determining the number density of carbide particles at a grain boundary.

Hereinafter, an embodiment of the invention is described in detail.

<Weld Metal>

The weld metal of the invention contains a predetermined amount of each of C, Si, Mn, Cr, Mo, V, Nb, N, and O, with the remainder consisting of Fe and inevitable impurities. The weld metal may further contain one or both of a predetermined amount of Cu and a predetermined amount of Ni, and furthermore may contain a predetermined amount of B. The weld metal may further contain a predetermined amount of one or more of W, Al, and Ti.

In the weld metal, an A value satisfies 200 or more, the A value being obtained by the weld metal composition according to a formula $$A\ value = ([V]/51 + [Nb]/93)/\{[V] \times ([Cr]/5 + [Mo]/2)\} \times 10^4.$$

In addition, a Z value is 0.05 or more, the Z value being obtained according to a formula $$Z\ value = N \times [insol.\ V],$$

where N is number density (particles/µm) of carbide particles per unit grain boundary, the carbide particles existing in a prior austenite grain boundary of a stress-relief annealed weld metal, and [insol. V] is concentration of compound-type V determined by an extraction residue of the stress-relief annealed weld metal.

Each of the components is now described.

<C: 0.05 to 0.15 Mass %>

C is an essential element for the weld metal to have strength. For the C content of less than 0.05 mass %, the weld metal does not have predetermined strength. In addition, the weld metal does not contain a sufficient amount of MC carbide, leading to degradation in creep rupture properties. For the C content of more than 0.15 mass %, carbide particles are coarsened, causing degradation in toughness. Consequently, the C content is 0.05 to 0.15 mass %. A preferred lower limit of the C content is 0.07 mass %, and a preferred upper limit thereof is 0.13 mass %.

<Si: 0.10 to 0.50 Mass %>

Si is an element to be contained in light of welding workability. For the Si content of less than 0.10 mass %, welding workability becomes bad. For the Si content of more than 0.50 mass %, the weld metal has excessively high strength or is increased in amount of hard phases such as martensite, leading to degradation in toughness. Consequently, the Si content is 0.10 to 0.50 mass %. A preferred lower limit of the Si content is 0.15 mass %, and a preferred upper limit thereof is 0.40 mass %.

<Mn: 0.60 to 1.30 Mass %>

Mn is an element necessary for the weld metal to have strength. For the Mn content of less than 0.60 mass %, the weld metal has a low strength at room temperature, and is less likely to have SR crack resistance. For the Mn content of more than 1.30 mass %, an impurity promptly segregates into a prior γ grain boundary, leading to degradation in temper embrittlement resistances. Consequently, the Mn content is 0.60 to 1.30 mass %. A lower limit of the Mn content is preferably 0.70 mass %, and more preferably 0.75 mass %. An upper limit thereof is preferably 1.20 mass %, and more preferably 1.15 mass %.

<Cr: 1.80 to 3.00 Mass %>

Cr is an element effective in improving SR crack resistance. For the Cr content of less than 1.80 mass %, film-like coarse cementite is precipitated in a prior γ grain boundary, and SR crack resistance is degraded. For the Cr content of more than 3.00 mass %, carbide particles are coarsened, causing degradation in toughness. Consequently, the Cr content is 1.80 to 3.00 mass %. A lower limit of the Cr content is preferably 1.90 mass %, and more preferably 2.00 mass %. An upper limit thereof is preferably 2.80 mass %, and more preferably 2.60 mass %.

<Mo: 0.80 to 1.20 Mass %>

Mo is an element necessary for the weld metal to have strength. For the Mo content of less than 0.80 mass %, the weld metal does not have predetermined strength. For the Mo content of more than 1.20 mass %, the weld metal has excessively high strength, leading to degradation in toughness. In addition, the amount of dissolved Mo is increased after SR annealing, and thus fine $Mo_2C$ particles are precipitated during step cooling, leading to degradation in temper embrittlement resistance. Consequently, the Mo content is 0.80 to 1.20 mass %. A lower limit of the Mo content is preferably 0.90 mass %. An upper limit thereof is preferably 1.15 mass %, and more preferably 1.10 mass %.

<V: 0.25 to 0.50 Mass %>

V is an element that contributes to improving creep rupture properties and temper embrittlement resistance through formation of MC carbide and formation of V carbide in a grain boundary. For the V content of less than 0.25 mass %, the weld metal does not have the predetermined properties. For the V content of more than 0.50 mass %, the weld metal has excessively high strength, leading to degradation in toughness. Consequently, the V content is 0.25 to 0.50 mass %. A lower limit of the V content is preferably 0.27 mass %, and more preferably 0.30 mass %. An upper limit thereof is preferably 0.45 mass %, and more preferably 0.40 mass %.

<Nb: 0.010 to 0.050 Mass %>

Nb is an element that contributes to improving creep rupture properties through formation of MC carbide. For the Nb content of less than 0.010 mass %, the weld metal does not have predetermined strength. For the Nb content of more than 0.050 mass %, the weld metal has excessively high strength, leading to degradation in toughness. Consequently, the Nb content is 0.010 to 0.050 mass %. A lower limit of the Nb content is preferably 0.012 mass %. An upper limit thereof is preferably 0.040 mass %, and more preferably 0.035 mass %.

<N: 0.025 Mass % or Less (not Including 0 Mass %)>

N is an element to be inevitably contained during welding, and is industrially difficult to be decreased to 0%. For the N content of more than 0.025 mass %, the weld metal has excessively high strength and therefore cannot have sufficient toughness. Consequently, the N content is 0.025 mass % or less. The N content is preferably 0.020 mass % or less, and more preferably 0.018 mass % or less.

<O: 0.020 to 0.060 Mass %>

O is an element that contributes to microstructure refinement through formation of oxide, and improves toughness. For the O content of less than 0.020 mass %, the effect of improving toughness is not exhibited. For the O content of more than 0.060 mass %, coarse oxide particles increase and act as initiation site of cracks, leading to degradation in toughness. Hence, the O content is 0.020 to 0.060 mass %. A lower limit of the O content is preferably 0.025 mass %. An upper limit thereof is preferably 0.050 mass %, and more preferably 0.045 mass %.

<Cu: 1.00 Mass % or Less (not Including 0 Mass %), Ni: 1.00 Mass % or Less (not Including 0 Mass %)>

Cu and Ni are each an element effective in improving toughness through microstructure refinement. For each of the Cu content and the Ni content of more than 1.00 mass %, the weld metal has excessively high strength, leading to degradation in toughness. Consequently, the Cu content and the Ni content are each 1.00 mass % or less. A lower limit of each of the Cu content and the Ni content is preferably 0.05 mass %, and more preferably 0.10 mass %. An upper limit thereof is preferably 0.80 mass %, and more preferably 0.50 mass %. The total content of Cu and Ni is preferably 0.05 to 1.50 mass %.

<B: 0.0050 Mass % or Less (not Including 0 Mass %)>

B is an element that suppresses ferrite formation at a grain boundary, and thereby increases strength. The B content of more than 0.0050 mass % degrades SR crack resistance. Consequently, the B content is 0.0050 mass % or less. The B content is preferably 0.0040 mass % or less, and more preferably 0.0025 mass % or less. A preferred lower limit of the B content is 0.0005 mass % or less.

<W: 0.50 Mass % or Less (not Including 0 Mass %)>

W is an element effective in increasing strength. The W content of more than 0.50 mass % coarsens carbide particles precipitated in a grain boundary, leading to bad influence on toughness. Consequently, the W content is 0.50 mass % or less. A preferred lower limit of the W content is 0.08 mass %. A preferred upper limit thereof is 0.30 mass %.

<Al: 0.030 Mass % or Less (not Including 0 Mass %)>

Al is a deoxidizing element. The Al content of more than 0.030 mass % coarsens oxide particles, leading to bad influence on toughness. Consequently, the Al content is 0.030 mass % or less. The Al content is preferably 0.020 mass % or less, and more preferably 0.015 mass % or less. A preferred lower limit of the Al content is 0.010 mass %.

<Ti: 0.020 Mass % or Less (not Including 0 Mass %)>

Ti is an element effective in increasing strength. For the Ti content of more than 0.020 mass %, precipitation strengthening by MC carbide is accelerated and thus innergranular strength is extremely increased, resulting in degradation in SR crack resistance. Consequently, the Ti content is 0.020 mass % or less. A preferred lower limit of the Ti content is 0.008 mass %. A preferred upper limit thereof is 0.015 mass %.

<Remainder: Fe and Inevitable Impurities>

The remainder of the weld metal consists of Fe and inevitable impurities. Examples of the inevitable impurities may include, but not limited to, P: 0.020 mass % or less, Sn: 0.010 mass % or less, and As: 0.010 mass % or less.

<A Value and Z Value>

$A$ value=$([V]/51+[Nb]/93)/\{[V]\times([Cr]/5+[Mo]/2)\}\times 10^4$: 200 or more.

$Z$ value=$N\times[\text{insol. V}]$: 0.05 or more.

The A value is a parameter for controlling the number of MC particles contributing to improvement in creep rupture properties. Specifically, the MC particles act as a barrier to dislocation migration during a creep rupture test, and thereby improves the creep rupture properties. Although such an action is enhanced with an increase in the number of MC particles, the number of MC particles is decreased by Ostwald ripening during the creep rupture test; hence, how to maintain the number of MC particles during the creep rupture test is a point for improving the creep rupture properties. The inventors therefore have investigated a technique for maintaining the number of MC particles during the creep rupture test. In addition, the inventors have found that the creep rupture properties are improved by suppressing Ostwald ripening, i.e., a decrease in number of MC particles, during the creep rupture test while a sufficient number of MC particles are prepared before the creep rupture test. From such two viewpoints, the inventors have discovered the A value as a parameter for controlling the number of MC particles during the creep rupture test.

To further improve the creep rupture properties, while it is effective to maintain the number of MC particles during the creep rupture test through controlling the A value, it is also effective to suppress grain boundary sliding during creep rupture test. In addition, it is necessary to make P segregation into a prior austenite grain boundary to be harmless, the P segregation causing temper embrittlement, in order to improve temper embrittlement resistance. The inventors therefore have investigated a measure satisfying the two, and have found that creep rupture properties and temper embrittlement resistance are each further improved by precipitating V carbide in a grain boundary. Here, "grain boundary" refers to large angle grain boundary that includes not only a ferrite grain boundary but also a prior austenite grain boundary, a block boundary, a packet boundary, and the like.

The carbide precipitated in the grain boundary (hereinafter, referred to as "carbide at grain boundary") acts as a resistance against grain boundary sliding during a creep rupture test. The number of the carbide particles at the grain boundary is in general decreased by Ostwald ripening during the creep rupture test, and thus the carbide particles gradually lose a function of suppressing the grain boundary sliding. Hence, it is effective in improving the creep rupture properties to suppress growth of the carbide at the grain boundary during the creep rupture test. The inventors have found that it is possible to suppress growth of the carbide at the grain boundary during the creep rupture test by precipitating V carbide in the grain boundary while the A value is satisfied.

In addition, the inventors have found that the V carbide precipitated in the grain boundary incorporates P and thereby allows the P segregation into the prior austenite grain boundary to be harmless, the P segregation causing temper embrittlement, and finally have completed the invention. Specifically, a plurality of types of carbide, such as V carbide, Cr carbide, and Mo carbide, exist in the prior austenite grain boundary. The inventors have investigated interaction between a type of the carbide at the grain boundary and segregated P with a physical analyzer that can three-dimensionally determine positions of individual atoms constituting a metal, i.e., three-dimensional atom probe, and have found that V carbide has a function of incorporating the segregated P, and have found that temper embrittlement can be suppressed by precipitating the V carbide in the grain boundary. Other types of carbide such as Cr carbide do not incorporate segregated P. P migrates into a boundary between the Cr carbide and a matrix, and thereby the boundary is weakened, so that temper embrittlement is not suppressed.

This finding can be applied not only to weld metal but also to general steel materials. The steel materials are promisingly improved in toughness and suppressed in temper embrittlement through precipitation of V carbide into a grain boundary.

The A value is a parameter for controlling the number of MC carbide particles and the number of the carbide particles at the grain boundary during the creep rupture test. For the A value of less than 200, the number of MC particles is small before the creep rupture test. Alternatively, Ostwald ripening of the MC particles and of the carbide particles at the grain boundary progresses during the creep rupture test. This decreases number density of MC particles and of the carbide particles at the grain boundary, leading to degradation in creep rupture properties. Hence, the A value is 200 or more. A lower limit of the A value is preferably 202, and more preferably 205. An upper limit of the A value is preferably 270, and more preferably 250.

The Z value is a parameter for determining the amount of V carbide at a grain boundary. A larger Z value means a larger number of V carbide particles in a grain boundary, leading to further improvement in creep rupture properties and in temper embrittlement resistance. For the Z value of lower than 0.05, one or both of creep rupture properties and temper embrittlement resistance does not satisfy a predetermined value. Consequently, the Z value is 0.05 or more. A lower limit of the Z value is preferably 0.07, and more preferably 1.00. An upper limit of the Z value is preferably 0.20, and more preferably 0.18.

<Determination of Number Density N (Particles/μm) of Carbide Particles at Grain Boundary>

Figure 1B:
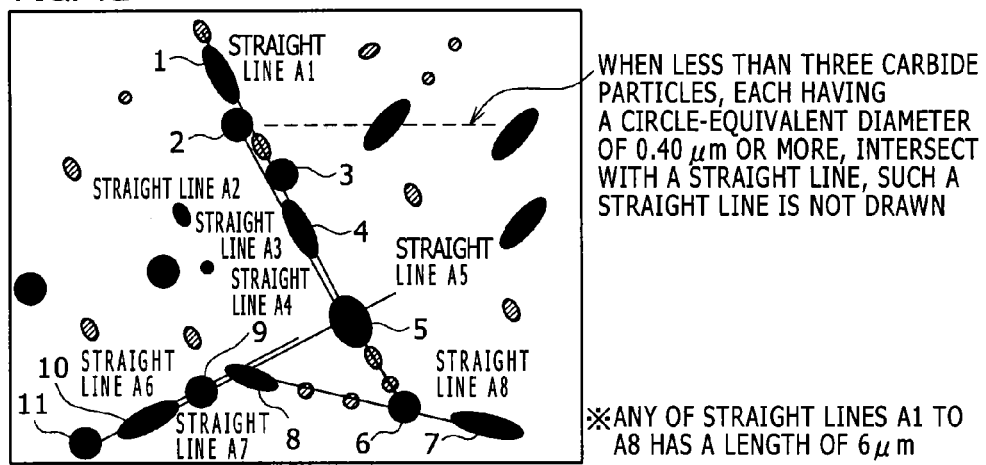
Figure 2A:
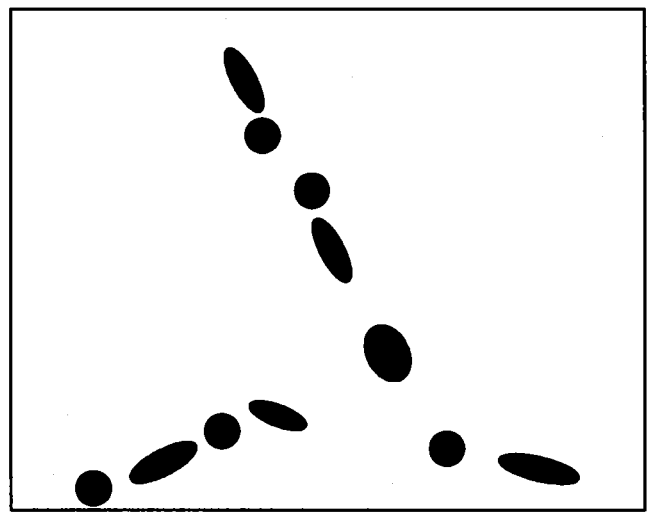
FIG. 2A and 2B include conceptual diagrams for explaining the method of determining the number density of carbide particles at a grain boundary.
Figure 2B:
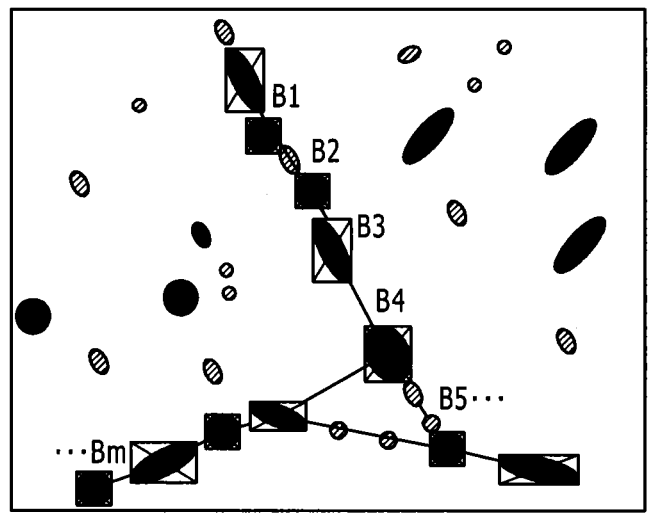

An exemplary determination process of the number density N (particles/μm) of the carbide particles at the grain boundary is now described with reference to FIGS. 1 and 2. In FIGS. 1 and 2, a circle drawn by a dot line has a circle-equivalent diameter of 0.4 μm, and corresponds to scale. A carbide particle having a circle-equivalent diameter of 0.40 μm or more is indicated by a black dot, and a carbide particle having a circle-equivalent diameter of less than 0.40 μm is indicated by a hatched dot.

First, a test specimen for replica TEM observation is obtained from the center of the final pass of weld metal subjected to SR annealing of 705° C.×8 hr. Subsequently, two images each having a visual field of 13.3×15.7 μm are photographed at 7500 magnifications ((a) of FIG. 1). The images are subjected to carbide form analysis with image analysis software (Image-Pro Plus, from Media Cybernetics) according to the following procedure.

(1) Straight lines Ai (i=1, 2, 3, . . . , n; n is the total of straight lines) 6 μm in length are selected, each straight line intersecting with at least three carbide particles each having a circle-equivalent diameter of 0.40 μm or more ((b) of FIG. 1). For example, in (b) of FIG. 1, a straight line A1 intersects with three carbide particles 1, 2, and 3, each having a circle-equivalent diameter of 0.40 μm or more, indicated by black dots. Similarly, a straight line A2 intersects with carbide particles 2, 3, and 4; a straight line A3 intersects with carbide particles 3, 4, and 5; a straight line A4 intersects with carbide particles 4, 5, and 6; a straight line A5 intersects with carbide particles 5, 8, and 9; a straight line A6 intersects with carbide particles 8, 9, and 10; a straight line A7 intersects with carbide particles 9, 10, and 11; and a straight line A8 intersects with carbide particles 8, 6, and 7. The straight lines Ai include the straight lines A1 to A8.

(2) Carbide particles each having a circle-equivalent diameter of 0.40 μm or more are selected, each carbide particle intersecting with one of the straight lines Ai ((a) of FIG. 2).

(3) The centers of circumscribed quadrangles of carbide particles adjacent to one another on each of the straight lines Ai are connected to one another by straight lines Bi (i=1, 2, 3, . . . , m; m is the total of straight lines), and the total length of the straight lines B1 to Bm is defined as grain boundary length L (μm) ((b) of FIG. 2).

(4) The quotient of the number of carbide particles divided by L (μm), each carbide particle having a circle-equivalent diameter of 0.40 μm or more and intersecting with one of the straight lines Bi, is defined as number density N (particles/μm) of the carbide particles at the grain boundary.

<Determination of Insol. V>

An exemplary determination process of insol. V is now described.

First, the thickness center of the weld metal subjected to SR annealing of 705° C.–8 hr is electrolytically extracted with a 10 vol % acetylacetone-1 vol % tetramethylammonium chloride-methanol solution. Subsequently, such an extract is filtrated by a filter having a pore size 0.1 μm and a residue is collected, and then the residue is subjected to ICP emission spectrometry to determine the concentration of compound-type V.

<Preferred Mode for Achieving Weld Metal of the Invention>

A preferred mode for achieving the weld metal of the invention is now described.

Each of a welding material and a welding condition must be controlled to be within a predetermined range in order to achieve the weld metal. A welding material composition is naturally restricted by a required weld metal composition. Furthermore, each of a welding condition and a welding material composition must be appropriately controlled in order to produce a predetermined carbide form.

Although any arc welding process can be used as a welding method for achieving the weld metal without limitation, preferred welding conditions of shielded metal arc welding (SMAW) and submerge arc welding (SAW) are as follows.

[Shielded Metal Arc Welding (SMAW)]
<Welding Heat Input 2.3 to 3.5 kJ/Mm, Interpass and Preheating Temperature 190 to 250° C.>

If heat input is below 2.3 kJ/mm, or if interpass and preheating temperature is below 190° C., cooling rate in welding is high, and a sufficient amount of carbide is not formed during cooling. The Z value therefore does not satisfy the predetermined range. If heat input is above 3.5 kJ/mm, or if interpass and preheating temperature is above 250° C., cooling rate in welding is low, and cementite formation is accelerated in a final stage of cooling, leading to a decrease in production of V carbide in a grain boundary. The Z value therefore does not satisfy the predetermined range.

To produce the predetermined weld metal under such a preferred welding condition, welding rods are preferably manufactured while the following conditions are satisfied.

<Mo concentration in core wire: 1.20 mass % or less (preferably 1.10 mass % or less), Cr concentration in core wire: 2.30 mass % or less (preferably 2.28 mass % or less, more preferably 2.26 mass % or less), Si/SiO$_2$ ratio in coating flux: 1.0 or more (preferably 1.1 or more, more preferably 1.2 or more), V concentration in coating flux: 0.85 mass % or more (preferably 1.00 mass % or more), $ZrO_2$ concentration in coating flux: 1.0 mass % or more (preferably 1.1 mass % or more)>

These are determined to control the Z value. If the above-described parameter is deviated from the predetermined range, Cr carbide, Mo carbide, and cementite are nucleated on an austenite grain boundary during cooling in welding. Consequently, the amount of V carbide is decreased during SR annealing, so that the Z value is not allowed to be maintained to be within the predetermined range. In particular, during cooling after welding, cementite is easily precipitated in a grain boundary since it is formed without diffusion of an alloy element. Hence, such precipitation of cementite and others are importantly suppressed. Dissolved Si is known to be effective in suppressing precipitation of cementite. To allow the weld metal to contain a certain amount of dissolved Si, it is necessary to control the $Si/SiO_2$ ratio to be high and to allow a certain amount of Zr as a strong oxidizing element to be contained.

[Submerge Arc Welding (SAW)]
<Welding Heat Input 2.2 to 5.0 kJ/Mm, Interpass and Preheating Temperature During Welding 190 to 250° C.>

If heat input is below 2.5 kJ/mm, or if interpass and preheating temperature is below 190° C., cooling rate in welding is high, and a sufficient amount of carbide is not formed during cooling. The Z value therefore does not satisfy the predetermined range. If heat input is above 5.0 kJ/mm, or if interpass and preheating temperature is above 250° C., cooling rate in welding is low, and cementite formation is accelerated in a final stage of cooling, leading to a decrease in production of V carbide in a grain boundary. The Z value therefore does not satisfy the predetermined range.

To produce the predetermined weld metal under such a preferred welding condition, the composition of the welding material is preferably controlled as follows.

<Si concentration in wire: 0.11 mass % or more (preferably 0.15 mass % or more), V/(Cr+Mo) ratio in wire: 0.11 or more (preferably 0.12 or more), $Si/SiO_2$ ratio in flux: 0.050 or more (preferably 0.060 or more)>

These are determined to control the Z value. If the above-described parameter is deviated from the predetermined range, Cr carbide, Mo carbide, and cementite are nucleated on an austenite grain boundary during cooling in welding. Consequently, the amount of V carbide is decreased during SR annealing, so that the Z value is not allowed to be maintained to be within the predetermined range.

<Welded Structure>

The welded structure of the invention includes one of the described weld metals.

For example, when a boiler or a chemical reaction container is manufactured, the predetermined member is welded into a welded structure under the above-described condition, thereby the welded structure includes the weld metal of the invention.

Since the welded structure includes one of the weld metals of the invention, a weld bead stably has temper embrittlement resistance, creep rupture properties, strength, toughness, and SR crack resistance. This leads to improvement in reliability and durability of equipment used under environment of high temperature and pressure, such as a boiler and a chemical reaction container.

EXAMPLE

To describe the effects of the invention, an example within the scope of the invention is now described in comparison with comparative examples out of the scope of the invention.

Weld metals were prepared using a base plate having a composition shown in Table 1 under welding conditions described later, and were evaluated in properties.

TABLE 1

| Base plate composition (mass %) Remainder: Fe and inevitable impurities | | | | | | | | | |
|---|---|---|---|---|---|---|---|---|---|
| C | Si | Mn | P | S | Cr | Mo | V | Nb | B |
| 0.13 | 0.25 | 0.59 | 0.006 | 0.003 | 2.36 | 1.00 | 0.30 | 0.022 | 0.0001 |

[Welding 1]
Welding method: Shielded metal arc welding (SMAW)
Welding condition:
Base plate thickness=20 mm
Groove angle=20° (V shape)
Root gap=19 mm
Welding position: Flat, 45° Vertical
Core wire diameter=5.0 mmφ
Heat input
(A) 2.1 kJ/mm (140 A-22 V, 9 cm/min)
(B) 2.5 kJ/mm (150 A-22 V, 8 cm/min)
(C) 2.9 kJ/mm (170 A-23 V, 8 cm/min)
(D) 3.3 kJ/mm (190 A-26 V, 9 cm/min)
(E) 3.7 kJ/mm (190 A-26 V, 8 cm/min)
Interpass and preheating temperature=180 to 260° C.
Build-up procedure=one layer-two pass.

Table 2 shows core wire compositions. Table 3 shows coating flux compositions. In Table 3, "-" indicates that a given component is not contained.

TABLE 2

| Simplified number | Core wire composition (mass %) Remainder: Fe and inevitable impurities | | | | | | |
|---|---|---|---|---|---|---|---|
| | C | Si | Mn | Cu | Ni | Cr | Mo |
| a | 0.07 | 0.13 | 0.50 | 0.03 | 0.02 | 2.26 | 1.03 |
| b | 0.08 | 0.13 | 0.48 | 0.03 | 0.02 | 2.29 | 1.15 |
| c | 0.05 | 0.20 | 0.45 | 0.04 | 0.02 | 1.39 | 0.55 |
| d | 0.09 | 0.15 | 0.49 | 0.04 | 0.03 | 2.31 | 1.10 |
| e | 0.08 | 0.18 | 0.50 | 0.03 | 0.03 | 2.28 | 1.22 |

TABLE 3

| Welding material No. | Coating flux composition (mass % (but "Si/SiO$_2$" is in ratio) Remainder: Fe, BaO, MgO, etc. | | | | | | | | | | | | | | | | | | | |
|---|---|---|---|---|---|---|---|---|---|---|---|---|---|---|---|---|---|---|---|---|
| | CaO | CO$_2$ | CaF$_2$ | C | Si | SiO$_2$ | Mn | Cr | Mo | V | Nb | Cu | Ni | B | W | Al | Ti | ZrO$_2$ | Si/SiO$_2$ | Others |
| B1 | 23 | 22 | 21 | 0.065 | 3.4 | 2.9 | 2.6 | 0.2 | — | 1.13 | 0.108 | — | — | 0.03 | — | 0.1 | 0.004 | 1.3 | 1.2 | 22 |
| B2 | 23 | 22 | 21 | 0.065 | 3.7 | 2.9 | 2.8 | 0.4 | 0.05 | 1.28 | 0.195 | — | — | 0.03 | — | 0.1 | 0.004 | 1.3 | 1.3 | 21 |
| B3 | 23 | 22 | 21 | 0.065 | 3.7 | 2.8 | 2.7 | 0.4 | — | 1.27 | 0.122 | — | — | 0.03 | — | 0.1 | 0.004 | 1.3 | 1.3 | 21 |
| B4 | 23 | 22 | 21 | 0.065 | 3.5 | 2.6 | 2.6 | 0.1 | — | 1.27 | 0.122 | — | — | 0.05 | — | 0.1 | 0.004 | 1.3 | 1.3 | 22 |
| B5 | 23 | 22 | 21 | 0.080 | 3.7 | 2.9 | 2.5 | 0.5 | — | 1.27 | 0.122 | — | — | 0.06 | — | 0.1 | 0.004 | 1.3 | 1.3 | 21 |

TABLE 3-continued

| Welding material No. | CaO | CO$_2$ | CaF$_2$ | C | Si | SiO$_2$ | Mn | Cr | Mo | V | Nb | Cu | Ni | B | W | Al | Ti | ZrO$_2$ | Si/SiO$_2$ | Others |
|---|---|---|---|---|---|---|---|---|---|---|---|---|---|---|---|---|---|---|---|---|
| B6 | 23 | 22 | 21 | 0.155 | 4.0 | 3.3 | 2.6 | 0.4 | 0.10 | 1.40 | 0.108 | 0.2 | — | 0.04 | — | 0.1 | 0.004 | 1.3 | 1.4 | 20 |
| B7 | 23 | 22 | 21 | 0.075 | 3.4 | 2.9 | 2.7 | 0.3 | — | 1.27 | 0.195 | — | 0.3 | 0.03 | — | 0.1 | 0.004 | 1.3 | 1.2 | 21 |
| B8 | 23 | 22 | 21 | 0.080 | 3.4 | 2.9 | 2.7 | 0.4 | — | 1.25 | 0.108 | — | — | 0.03 | — | 0.1 | 0.004 | 1.3 | 1.2 | 21 |
| B9 | 23 | 22 | 21 | 0.085 | 2.6 | 2.3 | 2.6 | 1.4 | — | 1.21 | 0.122 | — | — | 0.06 | — | 0.1 | 0.004 | 1.3 | 1.2 | 22 |
| B10 | 23 | 22 | 21 | 0.080 | 4.0 | 2.9 | 2.1 | 1.6 | 0.05 | 1.03 | 0.252 | 0.1 | 0.7 | 0.05 | 0.7 | 0.1 | 0.004 | 1.3 | 1.4 | 18 |
| B11 | 23 | 22 | 21 | 0.085 | 3.3 | 2.7 | 3.0 | 0.4 | — | 1.12 | 0.220 | — | — | 0.05 | — | 0.1 | 0.080 | 1.3 | 1.2 | 21 |
| B12 | 23 | 22 | 21 | 0.140 | 3.3 | 2.6 | 2.5 | 4.5 | 1.22 | 1.10 | 0.195 | 0.6 | 0.3 | 0.05 | — | 0.1 | 0.004 | 1.3 | 1.2 | 18 |
| B13 | 23 | 22 | 21 | 0.175 | 3.6 | 2.9 | 2.5 | 1.5 | — | 1.12 | 0.146 | 0.3 | 0.5 | 0.03 | — | 0.1 | 0.004 | 1.3 | 1.2 | 18 |
| B14 | 23 | 22 | 21 | 0.085 | 3.7 | 2.9 | 2.8 | 0.4 | — | 1.45 | 0.108 | — | — | 0.05 | — | 0.1 | 0.004 | 1.3 | 1.3 | 21 |
| B15 | 23 | 22 | 21 | 0.085 | 3.1 | 2.6 | 3.0 | 0.1 | 0.20 | 1.38 | 0.098 | 1.2 | — | 0.05 | — | 0.1 | 0.030 | 1.3 | 1.2 | 20 |
| B16 | 23 | 22 | 21 | 0.085 | 3.7 | 2.6 | 2.7 | 0.7 | — | 0.86 | 0.098 | — | — | 0.13 | — | 0.1 | 0.004 | 1.2 | 1.4 | 21 |
| B17 | 23 | 22 | 21 | 0.085 | 4.0 | 2.8 | 2.6 | 0.2 | — | 1.27 | 0.286 | — | — | 0.03 | — | 0.1 | 0.004 | 1.3 | 1.2 | 20 |
| B18 | 23 | 22 | 21 | 0.085 | 3.4 | 2.9 | 2.6 | 0.4 | — | 1.08 | 0.220 | — | — | 0.04 | 0.3 | 0.1 | 0.060 | 1.3 | 1.2 | 21 |
| B19 | 23 | 22 | 21 | 0.155 | 3.7 | 2.9 | 2.5 | 0.1 | — | 1.08 | 0.108 | — | 1.1 | 0.11 | — | 0.6 | 0.004 | 1.3 | 1.3 | 20 |
| B20 | 23 | 22 | 21 | 0.155 | 3.8 | 2.9 | 2.5 | 0.3 | — | 1.27 | 0.108 | — | — | 0.05 | — | 0.1 | 0.004 | 1.3 | 1.3 | 21 |
| B21 | 23 | 22 | 21 | 0.135 | 3.1 | 2.9 | 2.9 | 0.1 | 0.15 | 1.27 | 0.145 | — | — | 0.18 | — | 0.8 | 0.004 | 1.3 | 1.1 | 21 |
| B22 | 23 | 22 | 21 | 0.175 | 3.7 | 2.9 | 2.9 | 0.7 | 0.10 | 1.12 | 0.146 | — | — | 0.03 | — | 0.1 | 0.004 | 1.1 | 1.3 | 21 |
| B23 | 23 | 22 | 21 | 0.085 | 3.7 | 2.9 | 2.6 | 0.4 | — | 1.27 | 0.108 | — | — | 0.05 | — | 0.1 | 0.004 | 1.3 | 1.3 | 21 |
| B24 | 23 | 22 | 21 | 0.085 | 3.6 | 2.8 | 2.6 | 0.4 | — | 1.30 | 0.108 | — | — | 0.05 | — | 0.1 | 0.004 | 1.3 | 1.3 | 21 |
| B25 | 23 | 22 | 21 | 0.155 | 3.7 | 2.9 | 2.7 | 0.7 | 0.20 | 1.00 | 0.095 | — | — | 0.03 | — | 0.1 | 0.004 | 1.3 | 1.3 | 21 |
| B26 | 23 | 22 | 21 | 0.060 | 2.8 | 2.9 | 2.6 | 0.6 | — | 1.27 | 0.122 | — | — | 0.05 | — | 0.1 | 0.004 | 1.3 | 1.0 | 23 |
| B27 | 23 | 22 | 21 | 0.190 | 3.8 | 2.9 | 3.3 | 0.2 | 0.25 | 1.12 | 0.146 | — | — | 0.03 | — | 0.1 | 0.004 | 1.3 | 1.3 | 21 |
| B28 | 23 | 22 | 21 | 0.135 | 4.5 | 3.1 | 2.6 | 1.4 | 1.26 | 1.27 | 0.195 | — | — | 0.06 | — | 0.6 | 0.004 | 1.3 | 1.5 | 18 |
| B29 | 23 | 22 | 21 | 0.130 | 3.8 | 2.8 | 1.9 | 1.5 | 1.22 | 0.75 | 0.240 | — | — | 0.03 | — | 1.0 | 0.004 | 1.3 | 1.4 | 21 |
| B30 | 23 | 22 | 21 | 0.175 | 3.7 | 2.9 | 2.7 | 2.6 | — | 1.45 | 0.122 | — | — | 0.06 | 1.5 | 0.1 | 0.110 | 1.3 | 1.3 | 18 |
| B31 | 23 | 22 | 21 | 0.180 | 3.4 | 2.7 | 2.6 | 2.7 | 0.83 | 1.10 | 0.122 | 0.2 | — | 0.06 | — | 0.1 | 0.004 | 1.3 | 1.3 | 20 |
| B32 | 23 | 22 | 21 | 0.085 | 3.7 | 2.9 | 2.6 | 0.5 | — | 1.73 | 0.122 | 0.1 | 0.2 | 0.22 | — | 0.1 | 0.004 | 1.3 | 1.3 | 21 |
| B33 | 23 | 22 | 21 | 0.080 | 3.7 | 2.9 | 2.6 | 0.2 | — | 1.12 | 0.087 | — | — | 0.05 | — | 0.1 | 0.004 | 1.3 | 1.3 | 23 |
| B34 | 23 | 22 | 21 | 0.085 | 3.7 | 2.9 | 2.7 | 0.7 | — | 1.00 | 0.344 | 0.2 | — | 0.03 | — | 0.1 | 0.004 | 1.3 | 1.3 | 22 |
| B35 | 23 | 22 | 21 | 0.085 | 3.6 | 2.9 | 2.7 | 0.3 | — | 1.27 | 0.108 | — | — | 0.03 | — | 0.1 | 0.004 | 1.3 | 1.2 | 22 |
| B36 | 23 | 22 | 21 | 0.080 | 3.7 | 2.6 | 2.9 | 0.1 | — | 1.27 | 0.122 | 1.3 | — | 0.11 | — | 0.1 | 0.004 | 1.3 | 1.4 | 21 |
| B37 | 23 | 22 | 21 | 0.085 | 3.4 | 2.9 | 2.8 | 0.4 | — | 1.32 | 0.195 | — | 1.3 | 0.03 | — | 0.1 | 0.004 | 1.3 | 1.2 | 21 |
| B38 | 23 | 22 | 21 | 0.180 | 3.4 | 2.7 | 2.6 | 2.6 | 1.28 | 0.80 | 0.122 | 0.2 | — | 0.06 | — | 0.1 | 0.004 | 1.3 | 1.3 | 19 |
| B39 | 23 | 22 | 21 | 0.180 | 3.4 | 2.7 | 2.6 | 2.7 | 1.28 | 1.10 | 0122 | 0.2 | — | 0.06 | — | 0.1 | 0.004 | 0.9 | 1.3 | 19 |
| B40 | 23 | 22 | 21 | 0.085 | 3.0 | 3.5 | 2.7 | 0.1 | — | 1.30 | 0.122 | — | — | 0.03 | — | 0.1 | 0004 | 1.3 | 0.9 | 21 |

Welding method: Submerge arc welding (SAW)
Welding condition:
Base plate thickness=25 mm
Groove angle=10° (V shape)
Root gap=24 mm
Welding position: Flat
Wire diameter=4.0 mmφ
Heat input (AC single or AC-AC tandem)
(a) 2.1 kJ/mm (490 A-29 V, 40 cm/min)
(b) 2.3 kJ/mm (520 A-30 V, 40 cm/min)
(c) 3.6 kJ/mm (L: 580 A-30 V/T: 580 A-32 V, 60 cm/min)
(d) 4.8 kJ/mm (L: 580 A-30 V/T: 580 A-32 V, 45 cm/min)
(e) 5.1 kJ/mm (L: 580 A-30 V/T: 580 A-32 V, 42 cm/min)
* L: Leading wire (leading electrode), T: Trailing wire (trailing electrode)
Interpass and preheating temperature=180 to 260° C.
Build-up procedure=one layer-two pass.

Table 4 shows used flux compositions. Table 5 shows wire compositions. In Table 5, "-" indicates that a given component is not contained.

TABLE 4

| Simplified number | Flux composition (mass %) | | | | | | | |
|---|---|---|---|---|---|---|---|---|
| | SiO$_2$ | Al$_2$O$_3$ | MgO | CaF$_2$ | CaO | Si | *Others | Si/SiO$_2$ |
| A | 8 | 14 | 31 | 27 | 10 | 0.48 | 10 | 0.060 |
| B | 8 | 14 | 31 | 27 | 10 | 0.35 | 10 | 0.044 |
| C | 8 | 16 | 35 | 20 | 11 | 0.35 | 8 | 0.044 |

* Others: CO$_2$, AlF$_3$, etc.

TABLE 5

| Welding material No. | Wire composition (mass % (but "V/(Cr + Mo)" is in ratio) Remainder: Fe and inevitable impurities | | | | | | | | | | | | | | |
|---|---|---|---|---|---|---|---|---|---|---|---|---|---|---|---|
| | C | Si | Mn | Cr | Mo | V | Nb | N | O | Cu | Ni | B | W | Al | Ti | V/(Cr + Mo) |
| W1 | 0.135 | 0.20 | 1.2 | 2.1 | 1.03 | 0.38 | 0.021 | 0.006 | 0.015 | — | — | — | — | — | — | 0.12 |
| W2 | 0.135 | 0.20 | 1.2 | 2.1 | 1.03 | 0.40 | 0.022 | 0.006 | 0.015 | — | — | — | — | — | — | 0.13 |
| W3 | 0.125 | 0.25 | 1.3 | 2.3 | 1.06 | 0.42 | 0.022 | 0.006 | 0.015 | 0.11 | — | — | — | — | — | 0.12 |
| W4 | 0.135 | 0.20 | 1.2 | 2.3 | 1.03 | 0.38 | 0.022 | 0.006 | 0.015 | 0.12 | — | 0.0012 | — | — | — | 0.11 |
| W5 | 0.135 | 0.21 | 1.0 | 2.1 | 1.00 | 0.41 | 0.025 | 0.006 | 0.015 | 0.12 | — | 0.0018 | — | — | — | 0.13 |
| W6 | 0.140 | 0.21 | 1.1 | 2.1 | 1.06 | 0.39 | 0.025 | 0.006 | 0.015 | — | 0.20 | 0.0012 | — | — | — | 0.12 |
| W7 | 0.140 | 0.21 | 1.2 | 2.1 | 1.06 | 0.37 | 0.024 | 0.006 | 0.015 | 0.05 | 0.22 | 0.0012 | 0.16 | — | — | 0.12 |
| W8 | 0.140 | 0.21 | 1.3 | 2.5 | 1.04 | 0.39 | 0.023 | 0.006 | 0.015 | 0.06 | 0.20 | 0.0025 | — | — | — | 0.11 |

TABLE 5-continued

| Welding material No. | Wire composition (mass % (but "V/(Cr + Mo)" is in ratio) Remainder: Fe and inevitable impurities | | | | | | | | | | | | | | | |
|---|---|---|---|---|---|---|---|---|---|---|---|---|---|---|---|---|
| | C | Si | Mn | Cr | Mo | V | Nb | N | O | Cu | Ni | B | W | Al | Ti | V/(Cr + Mo) |
| W9 | 0.090 | 0.20 | 1.0 | 2.3 | 1.06 | 0.38 | 0.031 | 0.006 | 0.015 | 0.12 | — | 0.0025 | — | — | — | 0.11 |
| W10 | 0.170 | 0.20 | 1.2 | 2.5 | 1.06 | 0.44 | 0.038 | 0.006 | 0.015 | 0.11 | — | 0.0012 | — | — | — | 0.12 |
| W11 | 0.136 | 0.13 | 0.8 | 2.4 | 1.02 | 0.39 | 0.024 | 0.006 | 0.015 | 0.11 | — | 0.0032 | — | — | — | 0.11 |
| W12 | 0.115 | 0.82 | 1.3 | 2.0 | 0.95 | 0.33 | 0.025 | 0.006 | 0.015 | 0.12 | — | 0.0012 | — | — | — | 0.11 |
| W13 | 0.135 | 0.29 | 1.4 | 2.5 | 0.98 | 0.41 | 0.022 | 0.006 | 0.015 | 0.11 | 0.75 | 0.0015 | — | — | — | 0.12 |
| W14 | 0.135 | 0.28 | 1.1 | 1.9 | 1.05 | 0.38 | 0.025 | 0.006 | 0.015 | 0.11 | — | 0.0010 | 0.40 | — | — | 0.13 |
| W15 | 0.135 | 0.28 | 1.0 | 3.0 | 0.93 | 0.45 | 0.058 | 0.006 | 0.015 | 0.11 | — | 0.0012 | — | — | — | 0.11 |
| W16 | 0.135 | 0.35 | 1.0 | 2.1 | 1.24 | 0.45 | 0.024 | 0.006 | 0.015 | 0.12 | 0.34 | 0.0018 | — | — | — | 0.13 |
| W17 | 0.125 | 0.25 | 1.1 | 2.2 | 1.05 | 0.50 | 0.026 | 0.005 | 0.015 | 0.11 | 0.26 | 0.0012 | — | — | — | 0.15 |
| W18 | 0.145 | 0.26 | 1.0 | 2.5 | 1.00 | 0.39 | 0.060 | 0.006 | 0.015 | 0.11 | — | 0.0015 | 0.26 | — | — | 0.11 |
| W19 | 0.135 | 0.38 | 1.0 | 2.9 | 0.98 | 0.43 | 0.040 | 0.027 | 0.015 | 0.11 | 0.22 | 0.0012 | — | 0.03 | — | 0.11 |
| W20 | 0.135 | 0.38 | 1.2 | 2.3 | 1.10 | 0.45 | 0.012 | 0.006 | 0.026 | 0.11 | 0.06 | 0.0012 | — | — | 0.02 | 0.13 |
| W21 | 0.135 | 0.29 | 0.8 | 2.4 | 1.05 | 0.38 | 0.024 | 0.013 | 0.015 | 0.11 | — | 0.0018 | — | — | 0.03 | 0.11 |
| W22 | 0.135 | 0.40 | 1.2 | 2.1 | 0.96 | 0.37 | 0.033 | 0.006 | 0.015 | 0.11 | 0.98 | — | — | — | — | 0.12 |
| W23 | 0.135 | 0.21 | 1.2 | 2.3 | 0.83 | 0.37 | 0.038 | 0.006 | 0.013 | 0.11 | — | 0.0012 | — | 0.05 | — | 0.12 |
| W24 | 0.135 | 0.20 | 1.2 | 2.1 | 1.03 | 0.35 | 0.021 | 0.006 | 0.015 | — | — | — | — | — | — | 0.11 |
| W25 | 0.135 | 0.20 | 1.1 | 2.2 | 1.03 | 0.36 | 0.021 | 0.006 | 0.015 | — | — | — | — | — | — | 0.11 |
| W26 | 0.135 | 0.20 | 1.1 | 2.1 | 1.04 | 0.38 | 0.021 | 0.006 | 0.015 | — | — | 0.0015 | — | — | — | 0.12 |
| W27 | 0.135 | 0.20 | 1.2 | 2.1 | 1.06 | 0.38 | 0.021 | 0.006 | 0.015 | — | — | 0.0015 | — | — | — | 0.12 |
| W28 | 0.135 | 0.20 | 1.0 | 2.2 | 1.06 | 0.38 | 0.021 | 0.006 | 0.015 | — | — | 0.0012 | — | — | — | 0.12 |
| W29 | 0.140 | 0.22 | 1.2 | 2.6 | 1.04 | 0.41 | 0.023 | 0.006 | 0.015 | 0.06 | 0.18 | 0.0025 | — | — | — | 0.11 |
| W30 | 0.060 | 0.26 | 1.0 | 2.5 | 1.12 | 0.41 | 0.020 | 0.006 | 0.015 | 0.11 | — | 0.0012 | — | — | — | 0.11 |
| W31 | 0.185 | 0.27 | 1.1 | 1.9 | 0.96 | 0.37 | 0.023 | 0.006 | 0.015 | 0.11 | — | — | — | — | — | 0.13 |
| W32 | 0.135 | 0.69 | 0.6 | 2.3 | 1.07 | 0.39 | 0.022 | 0.006 | 0.015 | 0.11 | — | 0.0015 | — | — | — | 0.12 |
| W33 | 0.135 | 0.28 | 1.5 | 2.3 | 1.05 | 0.40 | 0.024 | 0.006 | 0.015 | 0.11 | — | 0.0012 | — | — | — | 0.12 |
| W34 | 0.140 | 0.26 | 1.1 | 3.3 | 1.36 | 0.46 | 0.031 | 0.006 | 0.015 | 1.20 | — | 0.0012 | — | — | — | 0.10 |
| W35 | 0.135 | 0.29 | 1.3 | 2.5 | 0.79 | 0.45 | 0.023 | 0.006 | 0.015 | 0.11 | — | 0.0012 | — | 0.08 | — | 0.14 |
| W36 | 0.135 | 0.30 | 1.2 | 2.1 | 0.85 | 0.27 | 0.038 | 0.006 | 0.015 | 0.11 | — | 0.0065 | — | — | — | 0.09 |
| W37 | 0.135 | 0.36 | 1.2 | 2.3 | 0.96 | 0.56 | 0.020 | 0.006 | 0.015 | 0.11 | — | — | 0.55 | — | — | 0.17 |
| W38 | 0.135 | 0.27 | 1.1 | 2.5 | 1.03 | 0.39 | 0.072 | 0.006 | 0.015 | 0.11 | — | — | — | — | 0.6 | 0.11 |
| W39 | 0.140 | 0.43 | 1.2 | 2.7 | 1.09 | 0.39 | 0.010 | 0.006 | 0.012 | 0.11 | — | — | — | 0.05 | — | 0.10 |
| W40 | 0.135 | 0.10 | 1.1 | 2.1 | 1.02 | 0.38 | 0.021 | 0.006 | 0.015 | — | — | — | — | — | — | 0.12 |
| W41 | 0.135 | 0.26 | 1.1 | 2.4 | 0.94 | 0.34 | 0.019 | 0.006 | 0.015 | 0.11 | — | 0.0010 | — | — | — | 0.10 |
| W42 | 0.135 | 0.20 | 1.2 | 2.3 | 1.05 | 0.38 | 0.022 | 0.006 | 0.015 | 0.12 | — | — | — | — | — | 0.11 |
| W43 | 0.090 | 0.20 | 1.0 | 2.29 | 1.10 | 0.38 | 0.031 | 0.006 | 0.015 | 0.12 | — | 0.0025 | — | — | — | 0.11 |
| W44 | 0.135 | 0.20 | 1.2 | 2.1 | 1.03 | 0.38 | 0.020 | 0.030 | 0.015 | — | — | — | — | — | — | 0.12 |
| W45 | 0.135 | 0.20 | 1.2 | 2.1 | 1.03 | 0.38 | 0.021 | 0.006 | 0.03 | — | — | — | — | — | — | 0.12 |
| W46 | 0.135 | 0.20 | 1.2 | 2.1 | 1.03 | 0.38 | 0.020 | 0.006 | 0.015 | — | 1.2 | — | — | — | — | 0.12 |

[Heat Treatment]
<SR Treatment>

Subsequently, each welded test sample was subjected to heat treatment of 705° C.×8 hr as the stress relief annealing treatment (SR treatment). In the SR treatment, the test sample was heated up to a temperature of 705° C. while a heating condition was adjusted such that the heating rate was 55° C./h or less above the test sample temperature of more than 300° C. The test sample was then held for eight hours at 705° C., and then cooled down to a temperature of 300° C. or lower at a cooling rate of 55° C./h or less. In the SR treatment, the heating rate and the cooling rate are each not regulated in a temperature range of the test sample of 300° C. or lower.

<Step Cooling>

Figure 3:
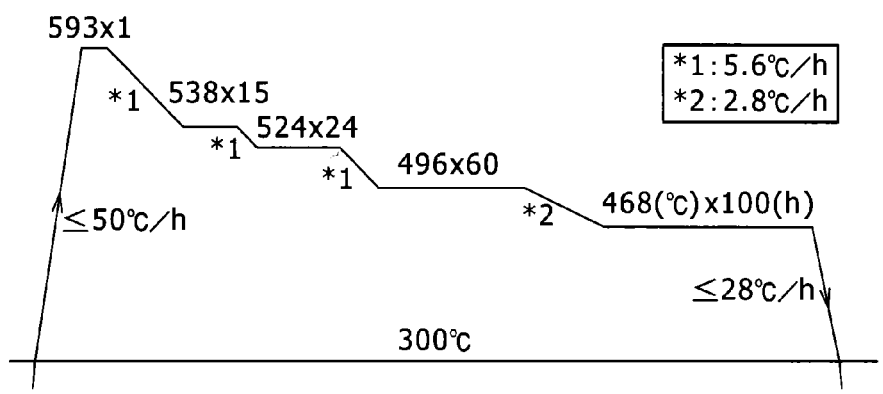
FIG. 3 is a graph for explaining a step cooling treatment condition in an example of the invention.

Subsequently, the SR-treated test sample was subjected to step cooling as an embrittlement accelerating treatment. FIG. 3 shows a graph with a vertical axis as temperature and a horizontal axis as time, the graph explaining the treatment condition of the step cooling. As illustrated in FIG. 3, in the step cooling, while a heating condition was adjusted such that the heating rate was 50° C./h or less at the test sample temperature of more than 300° C., the test sample was heated up to a temperature of 593° C. The test sample was then held for one hour at 593° C., and then cooled down to 538° C. at a cooling rate of 5.6° C./h and held for 15 hours at 538° C., and was then cooled down to 524° C. at the same cooling rate and held for 24 hours at 524° C., and was then cooled down to 496° C. at the same cooling rate and held for 60 hours at 496° C. Subsequently, the test sample was cooled down to 468° C. at a cooling rate of 2.8° C./h and held for 100 hours at 468° C. Subsequently, the test sample was cooled to a temperature of 300° C. or lower at a cooling rate of 28° C./h or less. In the step cooling, as with the SR treatment, the heating rate and the cooling rate are each not regulated in a temperature range of the test sample of 300° C. or lower.

[Determination and Evaluation]
<Determination of Chemical Composition of Weld Metal>

A sample for determination of a chemical composition was prepared as follows: A central portion of a weld metal formed in a groove was cut from the SR-treated test sample, and was subjected to chemical composition analysis by absorption photometry (for B), a combustion-infrared absorption method (for C), an inert gas fusion-thermal conductivity method (for N, O), and an inductively coupled plasma atomic emission spectrophotometry (for other elements). The determined chemical compositions are shown in Tables 6 and 8.

<Determination of Number Density N (Particles/µm) of Carbide Particles at Grain Boundary>

A determination procedure of the number density N (particles/µm) of the carbide particles at the grain boundary is now described with reference to FIGS. 1 and 2.

First, a test specimen for replica TEM observation was obtained from the center of the final pass of the weld metal subjected to SR annealing of 705° C.×8 hr. Subsequently, two images each having a visual field of 13.3×15.7 µm were photographed at 7500 magnifications ((a) of FIG. 1). The images were subjected to carbide form analysis with image analysis software (Image-Pro Plus from Media Cybernetics) according to the following procedure.

(1) Straight lines Ai (i=1, 2, 3, . . . , n; n is the total of straight lines) 6 µm in length were selected, each straight line intersecting with at least three carbide particles each having a circle-equivalent diameter of 0.40 µm or more ((b) of FIG. 1).

(2) Carbide particles each having a circle-equivalent diameter of 0.40 µm or more were selected, each carbide particle intersecting with one of the straight lines Ai ((a) of FIG. 2).

(3) The centers of circumscribed quadrangles of carbide particles adjacent to one another on each of the straight lines Ai were connected to one another by straight lines Bi (i=1, 2, 3, . . . , m; m is the total of straight lines), and the total length of the straight lines B1 to Bm was defined as grain boundary length L (µm) ((b) of FIG. 2).

(4) The quotient of the number of carbide particles divided by L (µm), each carbide particle having a circle-equivalent diameter of 0.40 µm or more and intersecting with one of the straight lines Bi, was defined as number density N (particles/µm) of the carbide particles at the grain boundary.

<Determination of Insol. V>

First, the thickness center of the weld metal subjected to SR annealing of 705° C.×8 hr was electrolytically extracted with a 10 vol % acetylacetone-1 vol % tetramethylammonium chloride-methanol solution. Subsequently, such an extract was filtrated by a filter having a pore size 0.1 µm and a residue was collected, and then the residue was subjected to ICP emission spectrometry to determine the concentration of compound-type V.

<Evaluation of Creep Rupture Properties>

The creep rupture properties were evaluated after the as-welded weld metal was subjected to SR annealing of 705° C.×32 hr. The specific procedure was as follows.

Figure 4A:
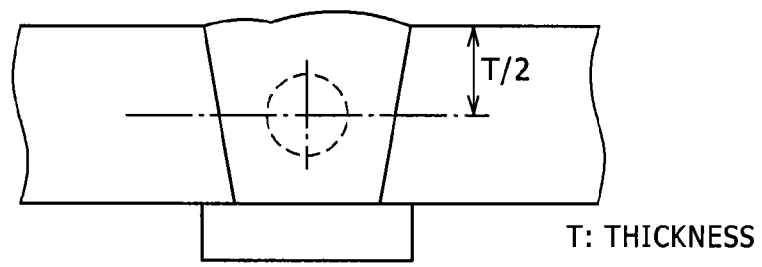
FIG. 4A, 4B and 4C include schematic diagrams illustrating sampling positions of test specimens used in the example of the invention, where (a) illustrates a sampling position of a test specimen used for evaluation of creep rupture properties, (b) illustrates a sampling position of a test specimen used for evaluation of strength, and (c) illustrates a sampling position of a test specimen used for evaluation of toughness.
Figure 4B:
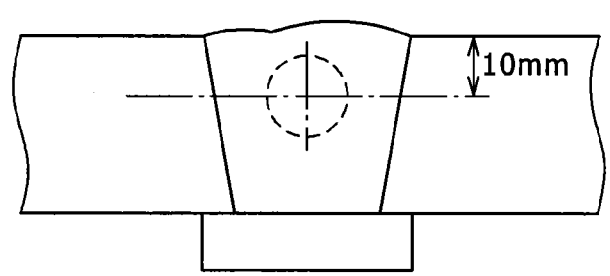
Figure 4C:
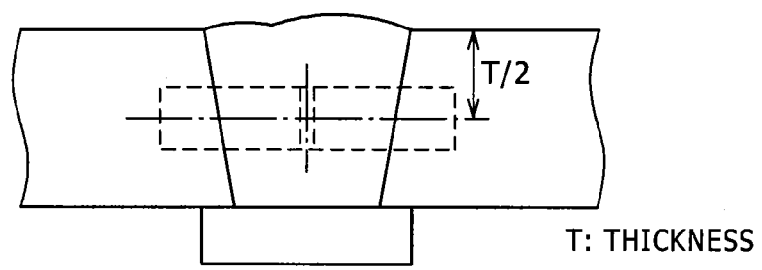
Figure 5A:
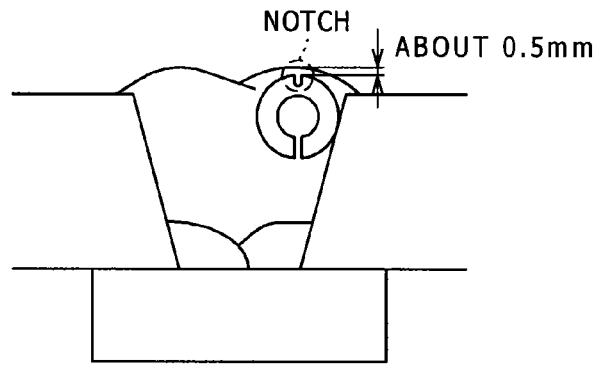
FIG. 5A, 5B, 5C and 5D include schematic diagrams for explaining a test specimen used for evaluation of SR crack resistance in the example of the invention.
Figure 5B:
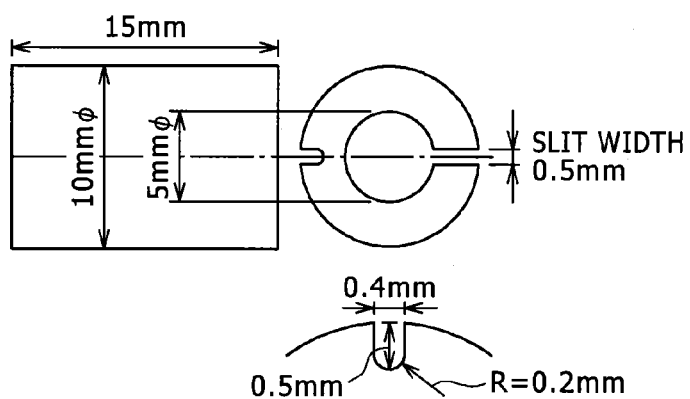
Figure 5C:
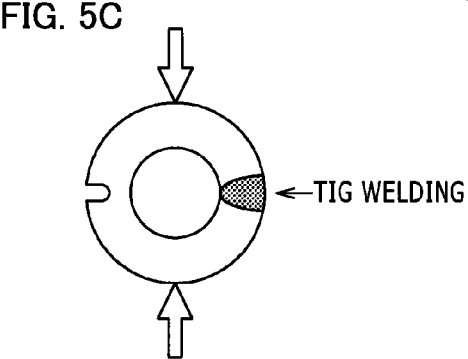
Figure 5D:
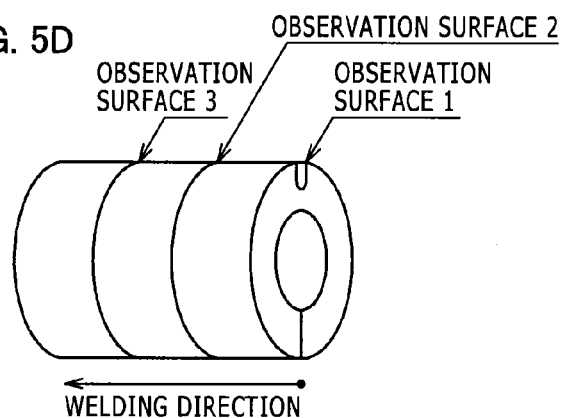

A creep test specimen, having a diameter of 6.0 mm and a gage length of 30 mm, was taken in a welding line direction illustrated in (a) of FIG. 4 from the thickness center of the weld metal subjected to the SR annealing of 705° C.×32 hr. The test specimen was subjected to a creep test under a condition of 540° C. and 210 MPa. A weld metal showing a rupture time of more than 1000 hr was evaluated to be good in creep rupture properties.

<Evaluation of Strength>

Strength was evaluated after the as-welded weld metal was subjected to SR annealing of 705° C.×32 hr. The specific procedure was as follows.

A tensile test specimen (JIS Z3111 A2) was taken in a welding line direction illustrated in (b) of FIG. 4 at a depth position of 10 mm from the thickness surface of the weld metal subjected to the SR annealing of 705° C.×32 hr. The test specimen was determined in tensile strength (TS) according to the procedure of JIS Z 2241. A weld metal showing TS of more than 600 MPa was evaluated to be good in strength.

<Evaluation of Toughness>

Toughness was first evaluated after the as-welded weld metal was subjected to SR annealing of 705° C.×8 hr, and second evaluated after the as-welded weld metal was subjected to SR annealing of 705° C.×8 hr and successively subjected to step cooling. The specific procedure was as follows.

A Charpy impact test specimen (JIS Z 31114 V-notch test specimen) was taken perpendicularly to a welding line direction illustrated in (c) of FIG. 4 from the thickness center of the weld metal subjected to the SR annealing of 705° C.×8 hr. The test specimen was subjected to a Charpy impact test according to the procedure of JIS Z 2242. Specifically, the temperature $vTr_{54}$ at which absorbed energy was 54 J was determined as an average of three measurements. For the weld metal subjected to step cooling after the SR annealing of 705° C.×8 hr, the temperature $vTr'_{54}$ at which absorbed energy was 54 J was determined according to a similar procedure. A weld metal of which the $vTr_{54}$ and $vTr'_{54}$ were each −50° C. or lower was evaluated to be good in toughness.

<Evaluation of Temper Embrittlement Resistance>

The temper embrittlement resistance was evaluated after the as-welded weld metal was subjected to SR annealing of 705° C.×8 hr and successively subjected to step cooling. The specific procedure was as follows.

A weld metal satisfying "$\Delta vTr_{54} = vTr'_{54} - vTr_{54} \leq 5° C.$" was evaluated to be good in temper embrittlement resistance. A $\Delta vTr_{54}$ having a negative value was represented as "0° C.". Such a value of $\Delta vTr_{54}$ shows a good weld metal with substantially no temper embrittlement.

<Evaluation of SR Crack Resistance>

The SR crack resistance was evaluated after the as-welded weld metal was subjected to SR annealing of 625° C.×10 hr. The specific procedure was as follows.

A ring crack test specimen having a slit width of 0.5 mm was taken from a final pass (as-welded zone) of the weld metal such that a neighborhood of a U notch corresponded to the as-welded zone illustrated in (a) of FIG. 5. The test was performed two times. The shape of the test specimen is shown in (b) of FIG. 5.

As illustrated in (c) of FIG. 5, the 0.5 mm slit was forcedly contracted into a slit width of 0.05 mm, and then the contracted slit was closed by TIG welding, so that tensile residual stress was applied to a notch bottom. The TIG-welded test specimen was subjected to SR annealing of 625° C.×10 hr, and then, as illustrated in (d) of FIG. 5, the test specimen was divided into three equal parts, and the section (near the notch bottom) of each part was observed by a light microscope to observe SR crack occurrence. A weld metal, of which all the six test specimens (=three observation surfaces by two tests) showed no crack occurrence in the neighborhood of the notch, was evaluated to be good in SR crack resistance.

Tables 6 to 9 show results of such evaluations. Tables 6 and 7 show the results for the shielded metal arc welding (SMAW), and Tables 8 and 9 show the results for the submerge arc welding (SAW). An underlined numerical value does not satisfy the scope or the criterion of the invention.

TABLE 6

| Experiment No. | Welding position | Coating flux No. | Core wire | Heat input condition | Interpass and preheating temperature | Weld metal composition (mass %) Remainder: Fe and inevitable impurities | | | | | |
|---|---|---|---|---|---|---|---|---|---|---|---|
| | | | | | | C | Si | Mn | Cr | Mo | V |
| 1 | Flat | B1 | a | B | 200 | 0.09 | 0.25 | 0.97 | 2.12 | 1.01 | 0.35 |
| 2 | Flat | B2 | a | B | 210 | 0.08 | 0.27 | 1.10 | 2.20 | 1.04 | 0.38 |
| 3 | Flat | B3 | a | B | 200 | 0.08 | 0.30 | 1.05 | 2.18 | 1.02 | 0.36 |
| 4 | Flat | B4 | b | B | 230 | 0.09 | 0.27 | 0.92 | 1.69 | 1.06 | 0.37 |
| 5 | Flat | B5 | a | B | 200 | 0.07 | 0.25 | 0.90 | 2.24 | 1.03 | 0.38 |
| 6 | Flat | B6 | a | B | 190 | 0.10 | 0.43 | 0.87 | 2.10 | 1.08 | 0.40 |
| 7 | Flat | B7 | b | C | 200 | 0.06 | 0.26 | 1.03 | 2.14 | 1.05 | 0.38 |
| 8 | Flat | B8 | b | B | 200 | 0.07 | 0.27 | 1.04 | 2.18 | 1.05 | 0.36 |
| 9 | Flat | B9 | a | B | 200 | 0.08 | 0.11 | 0.83 | 2.44 | 1.02 | 0.38 |
| 10 | Flat | B10 | a | D | 210 | 0.07 | 0.34 | 0.66 | 2.83 | 1.05 | 0.27 |
| 11 | Flat | B11 | b | D | 220 | 0.09 | 0.28 | 1.25 | 2.25 | 1.06 | 0.32 |
| 12 | Flat | B12 | c | B | 240 | 0.10 | 0.28 | 0.69 | 2.84 | 0.65 | 0.29 |
| 13 | Flat | B13 | a | C | 210 | 0.14 | 0.28 | 0.90 | 2.45 | 1.00 | 0.31 |
| 14 | Flat | B14 | a | B | 210 | 0.08 | 0.29 | 1.07 | 2.14 | 1.02 | 0.47 |
| 15 | 45° vertical | B15 | a | C | 200 | 0.09 | 0.17 | 1.12 | 2.05 | 1.16 | 0.40 |
| 16 | 45° vertical | B16 | b | D | 210 | 0.10 | 0.30 | 0.99 | 2.39 | 1.01 | 0.25 |
| 17 | Flat | B17 | a | C | 200 | 0.07 | 0.38 | 0.94 | 2.10 | 1.02 | 0.38 |
| 18 | Flat | B18 | a | C | 220 | 0.07 | 0.25 | 0.97 | 2.22 | 0.97 | 0.32 |
| 19 | Flat | B19 | a | C | 210 | 0.11 | 0.29 | 0.88 | 2.07 | 1.00 | 0.30 |
| 20 | Flat | B20 | a | C | 200 | 0.12 | 0.31 | 0.85 | 2.08 | 1.01 | 0.38 |
| 21 | Flat | B21 | a | C | 200 | 0.10 | 0.21 | 1.13 | 2.01 | 1.11 | 0.35 |
| 22 | Flat | B22 | a | C | 230 | 0.13 | 0.30 | 1.16 | 2.27 | 1.06 | 0.33 |
| 23 | Flat | B1 | a | A | 200 | 0.08 | 0.27 | 0.93 | 2.13 | 1.00 | 0.33 |
| 24 | 45° vertical | B1 | a | E | 200 | 0.06 | 0.24 | 0.92 | 2.14 | 1.00 | 0.32 |
| 25 | Flat | B1 | a | B | 180 | 0.09 | 0.26 | 0.94 | 2.12 | 0.97 | 0.33 |
| 26 | Flat | B1 | a | B | 260 | 0.09 | 0.26 | 0.97 | 2.07 | 0.98 | 0.33 |
| 27 | Flat | B23 | d | B | 200 | 0.08 | 0.32 | 0.96 | 2.26 | 1.02 | 0.38 |
| 28 | Flat | B24 | a | C | 210 | 0.08 | 0.28 | 0.95 | 2.26 | 1.10 | 0.40 |
| 29 | Flat | B25 | a | B | 210 | 0.10 | 0.29 | 0.99 | 2.33 | 1.14 | 0.32 |
| 30 | Flat | B26 | a | B | 210 | 0.04 | 0.14 | 0.97 | 2.30 | 1.03 | 0.37 |
| 31 | Flat | B27 | c | C | 220 | <u>0.15</u> | 0.23 | <u>1.32</u> | 2.14 | <u>1.23</u> | 0.34 |
| 32 | Flat | B28 | c | B | 200 | 0.09 | 0.52 | <u>0.38</u> | 1.77 | 1.04 | 0.37 |
| 33 | Flat | B29 | c | B | 220 | 0.06 | 0.36 | <u>0.58</u> | 1.82 | 0.87 | <u>0.24</u> |
| 34 | 45° vertical | B30 | a | D | 200 | 0.13 | 0.28 | 0.93 | <u>3.02</u> | 1.03 | 0.44 |
| 35 | Flat | B31 | c | B | 210 | 0.12 | 0.28 | 0.95 | 2.18 | <u>0.77</u> | 0.33 |
| 36 | 45° vertical | B32 | a | C | 230 | 0.06 | 0.28 | 0.94 | 2.26 | 1.00 | 0.51 |
| 37 | Flat | B33 | b | B | 200 | 0.07 | 0.30 | 0.95 | 2.19 | 1.06 | 0.34 |
| 38 | Flat | B34 | a | D | 200 | 0.08 | 0.29 | 0.98 | 2.26 | 1.02 | 0.32 |
| 39 | Flat | B35 | a | B | 210 | 0.07 | 0.27 | 0.96 | 2.13 | 1.02 | 0.35 |
| 40 | Flat | B36 | b | B | 200 | 0.07 | 0.28 | 1.13 | 1.97 | 1.08 | 0.37 |
| 41 | Flat | B37 | a | B | 200 | 0.08 | 0.27 | 1.05 | 2.20 | 1.02 | 0.41 |
| 42 | Flat | B38 | c | B | 210 | 0.11 | 0.27 | 0.95 | 2.18 | 1.03 | 0.26 |
| 43 | Flat | B39 | c | B | 210 | 0.12 | 0.25 | 0.96 | 2.20 | 1.03 | 0.33 |
| 44 | Flat | B40 | a | B | 200 | 0.06 | 0.26 | 0.97 | 2.04 | 1.01 | 0.38 |

| Experiment No. | Weld metal composition (mass %) Remainder: Fe and inevitable impurities | | | | | | | | | A value | Z value |
|---|---|---|---|---|---|---|---|---|---|---|---|
| | Nb | N | O | Cu | Ni | B | W | Al | Ti | | |
| 1 | 0.018 | 0.014 | 0.038 | — | — | — | — | — | — | 217 | 0.07 |
| 2 | 0.025 | 0.014 | 0.038 | — | — | — | — | — | — | 212 | 0.07 |
| 3 | 0.020 | 0.014 | 0.037 | 0.03 | — | — | — | — | — | 213 | 0.12 |
| 4 | 0.021 | 0.013 | 0.032 | 0.03 | 0.03 | 0.0011 | — | — | — | 223 | 0.11 |
| 5 | 0.019 | 0.015 | 0.035 | 0.03 | 0.02 | 0.0016 | — | — | — | 209 | 0.06 |
| 6 | 0.019 | 0.013 | 0.021 | 0.14 | 0.03 | 0.0007 | — | — | — | 210 | 0.11 |
| 7 | 0.025 | 0.015 | 0.040 | 0.02 | 0.20 | — | — | — | — | 213 | 0.09 |
| 8 | 0.018 | 0.015 | 0.053 | 0.06 | 0.05 | 0.0005 | — | — | — | 210 | 0.10 |
| 9 | 0.020 | 0.014 | 0.027 | 0.04 | 0.03 | 0.0014 | — | — | — | 202 | 0.08 |
| 10 | 0.037 | 0.012 | 0.036 | 0.06 | 0.55 | 0.0013 | 0.25 | — | — | 201 | 0.09 |
| 11 | 0.033 | 0.012 | 0.041 | 0.05 | 0.04 | 0.0009 | — | — | 0.016 | 211 | 0.12 |
| 12 | 0.026 | 0.012 | 0.027 | 0.42 | 0.17 | 0.0013 | — | — | — | 207 | 0.09 |
| 13 | 0.023 | 0.014 | 0.030 | 0.25 | 0.33 | — | — | — | 0.008 | 208 | 0.10 |
| 14 | 0.018 | 0.011 | 0.034 | 0.03 | 0.05 | 0.0010 | — | — | — | 213 | 0.14 |
| 15 | 0.012 | 0.013 | 0.035 | 0.92 | 0.02 | 0.0014 | — | — | 0.006 | 201 | 0.12 |
| 16 | 0.010 | 0.012 | 0.034 | 0.03 | 0.04 | 0.0022 | — | — | — | 204 | 0.06 |
| 17 | 0.043 | 0.013 | 0.034 | 0.04 | — | — | — | — | — | 224 | 0.13 |
| 18 | 0.038 | 0.022 | 0.038 | 0.04 | 0.03 | 0.0007 | 0.15 | — | 0.014 | 224 | 0.08 |
| 19 | 0.018 | 0.016 | 0.031 | — | 0.88 | 0.0021 | — | 0.016 | — | 222 | 0.13 |
| 20 | 0.018 | 0.015 | 0.038 | 0.02 | — | 0.0012 | — | — | — | 218 | 0.10 |
| 21 | 0.021 | 0.014 | 0.044 | 0.03 | 0.04 | 0.0045 | — | 0.028 | — | 212 | 0.06 |
| 22 | 0.026 | 0.011 | 0.040 | 0.03 | 0.04 | — | — | — | — | 208 | 0.06 |
| 23 | 0.018 | 0.012 | 0.034 | — | — | — | — | — | — | 218 | <u>0.04</u> |
| 24 | 0.019 | 0.011 | 0.032 | — | — | — | — | — | — | 218 | <u>0.03</u> |
| 25 | 0.018 | 0.012 | 0.032 | — | — | — | — | — | — | 223 | <u>0.04</u> |

TABLE 6-continued

| | | | | | | | | | | |
|---|---|---|---|---|---|---|---|---|---|---|
| 26 | 0.020 | 0.012 | 0.032 | — | — | — | — | — | — | 224 | 0.04 |
| 27 | 0.016 | 0.012 | 0.034 | 0.03 | 0.02 | 0.0009 | — | — | — | 209 | 0.04 |
| 28 | 0.016 | 0.013 | 0.035 | 0.04 | 0.03 | 0.0013 | — | — | — | 201 | 0.04 |
| 29 | 0.013 | 0.014 | 0.038 | 0.05 | 0.06 | — | — | — | — | 193 | 0.11 |
| 30 | 0.020 | 0.013 | 0.061 | 0.02 | 0.04 | 0.0010 | — | — | — | 207 | 0.05 |
| 31 | 0.023 | 0.013 | 0.036 | 0.02 | 0.05 | — | — | — | — | 195 | 0.13 |
| 32 | 0.025 | 0.012 | 0.019 | 0.02 | 0.04 | 0.0018 | — | 0.024 | — | 233 | 0.10 |
| 33 | 0.037 | 0.013 | 0.022 | 0.03 | 0.03 | — | — | 0.038 | — | 268 | 0.04 |
| 34 | 0.022 | 0.016 | 0.033 | 0.04 | 0.08 | 0.0013 | 0.55 | — | 0.021 | 160 | 0.19 |
| 35 | 0.020 | 0.015 | 0.033 | 0.16 | 0.02 | 0.0018 | — | — | — | 247 | 0.10 |
| 36 | 0.021 | 0.015 | 0.033 | 0.03 | 0.11 | 0.0052 | — | — | — | 204 | 0.11 |
| 37 | 0.008 | 0.014 | 0.039 | 0.04 | 0.05 | 0.0013 | — | — | — | 205 | 0.06 |
| 38 | 0.052 | 0.016 | 0.031 | 0.11 | 0.04 | — | — | — | — | 221 | 0.10 |
| 39 | 0.018 | 0.027 | 0.030 | 0.03 | 0.05 | — | — | — | — | 215 | 0.09 |
| 40 | 0.022 | 0.012 | 0.032 | 1.03 | 0.05 | 0.0021 | — | — | — | 219 | 0.08 |
| 41 | 0.026 | 0.014 | 0.037 | 0.03 | 1.05 | — | — | — | — | 214 | 0.10 |
| 42 | 0.021 | 0.015 | 0.035 | 0.15 | 0.02 | 0.0015 | — | — | — | 215 | 0.04 |
| 43 | 0.020 | 0.015 | 0.033 | 0.16 | 0.02 | 0.0016 | — | — | — | 212 | 0.04 |
| 44 | 0.021 | 0.014 | 0.043 | 0.04 | 0.04 | — | — | — | — | 221 | 0.03 |

TABLE 7

| Experiment No. | Strength TS [MPa] | Toughness $vTr_{54}$ [° C.] | Toughness $vTr'_{54}$ [° C.] | Temper embrittlement resistance $\Delta vTr_{54}$ [° C.] | SR crack resistance | Creep rupture properties Rupture time Tr [hr] |
|---|---|---|---|---|---|---|
| 1 | 663 | −55 | −52 | 3 | ○ | 1338 |
| 2 | 641 | −54 | −53 | 1 | ○ | 1756 |
| 3 | 642 | −57 | −55 | 2 | ○ | 1957 |
| 4 | 638 | −55 | −53 | 2 | ○ | 1235 |
| 5 | 641 | −56 | −54 | 2 | ○ | 2103 |
| 6 | 655 | −51 | −51 | 0 | ○ | 2047 |
| 7 | 617 | −55 | −54 | 1 | ○ | 1209 |
| 8 | 638 | −51 | −50 | 1 | ○ | 1321 |
| 9 | 623 | −56 | −54 | 2 | ○ | 1055 |
| 10 | 610 | −58 | −56 | 2 | ○ | 1023 |
| 11 | 684 | −51 | −50 | 1 | ○ | 1536 |
| 12 | 609 | −52 | −51 | 1 | ○ | 1185 |
| 13 | 687 | −51 | −50 | 1 | ○ | 2036 |
| 14 | 681 | −52 | −50 | 2 | ○ | 1602 |
| 15 | 675 | −51 | −50 | 1 | ○ | 1167 |
| 16 | 617 | −58 | −53 | 5 | ○ | 1022 |
| 17 | 660 | −52 | −50 | 2 | ○ | 1563 |
| 18 | 675 | −51 | −50 | 1 | ○ | 1432 |
| 19 | 667 | −51 | −51 | 0 | ○ | 1698 |
| 20 | 638 | −59 | −57 | 2 | ○ | 2053 |
| 21 | 675 | −56 | −51 | 5 | ○ | 1151 |
| 22 | 682 | −55 | −50 | 5 | ○ | 1186 |
| 23 | 638 | −56 | −50 | 6 | ○ | 941 |
| 24 | 642 | −57 | −51 | 6 | ○ | 922 |
| 25 | 648 | −56 | −50 | 6 | ○ | 953 |
| 26 | 639 | −57 | −50 | 7 | ○ | 946 |
| 27 | 632 | −58 | −51 | 7 | ○ | 1206 |
| 28 | 637 | −56 | −50 | 6 | ○ | 1211 |
| 29 | 651 | −52 | −50 | 2 | ○ | 930 |
| 30 | 594 | −41 | −36 | 5 | ○ | 813 |
| 31 | 721 | −36 | −25 | 11 | ○ | 941 |
| 32 | 705 | −41 | −38 | 3 | X | 1041 |
| 33 | 581 | −36 | −27 | 9 | X | 933 |
| 34 | 702 | −37 | −33 | 4 | X | 810 |
| 35 | 590 | −55 | −53 | 2 | ○ | 848 |
| 36 | 699 | −49 | −47 | 2 | X | 1153 |
| 37 | 583 | −56 | −53 | 3 | ○ | 957 |
| 38 | 705 | −44 | −40 | 4 | ○ | 1806 |
| 39 | 672 | −42 | −38 | 4 | ○ | 1354 |
| 40 | 688 | −44 | −41 | 3 | ○ | 1301 |
| 41 | 704 | −47 | −46 | 1 | ○ | 1156 |
| 42 | 622 | −58 | −52 | 6 | ○ | 882 |
| 43 | 630 | −57 | −50 | 7 | ○ | 948 |
| 44 | 633 | −56 | −50 | 6 | ○ | 1251 |

TABLE 8

| Experiment No. | Welding material No. | Heat input condition | Used flux | Interpass and preheating temperature | Weld metal composition (mass %) Remainder: Fe and inevitable impurities | | | | | |
|---|---|---|---|---|---|---|---|---|---|---|
| | | | | | C | Si | Mn | Cr | Mo | V |
| 1 | W1 | c | A | 200 | 0.10 | 0.16 | 1.03 | 2.07 | 1.01 | 0.34 |
| 2 | W2 | b | A | 210 | 0.11 | 0.16 | 0.98 | 2.07 | 1.02 | 0.38 |
| 3 | W3 | c | A | 210 | 0.08 | 0.19 | 1.09 | 2.25 | 1.03 | 0.39 |
| 4 | W4 | c | A | 200 | 0.10 | 0.15 | 1.02 | 2.21 | 0.99 | 0.33 |
| 5 | W5 | d | A | 190 | 0.09 | 0.16 | 0.86 | 2.09 | 0.95 | 0.38 |
| 6 | W6 | d | A | 210 | 0.11 | 0.18 | 0.96 | 2.03 | 1.01 | 0.36 |
| 7 | W7 | c | A | 220 | 0.12 | 0.16 | 1.02 | 2.00 | 1.04 | 0.36 |
| 8 | W8 | c | A | 210 | 0.12 | 0.17 | 1.08 | 2.42 | 1.02 | 0.37 |
| 9 | W9 | d | A | 190 | 0.06 | 0.15 | 0.90 | 2.23 | 1.02 | 0.32 |
| 10 | W10 | c | A | 220 | 0.15 | 0.15 | 1.00 | 2.39 | 1.03 | 0.42 |
| 11 | W11 | d | A | 200 | 0.11 | 0.12 | 0.68 | 2.29 | 0.98 | 0.35 |
| 12 | W12 | c | A | 210 | 0.07 | 0.42 | 1.09 | 1.95 | 0.92 | 0.28 |
| 13 | W13 | c | A | 220 | 0.10 | 0.19 | 1.23 | 2.47 | 0.95 | 0.37 |
| 14 | W14 | c | A | 210 | 0.10 | 0.19 | 0.94 | 1.85 | 1.04 | 0.38 |
| 15 | W15 | c | A | 220 | 0.10 | 0.20 | 0.86 | 2.85 | 0.92 | 0.43 |

TABLE 8-continued

| | | | | | | | | | | |
|---|---|---|---|---|---|---|---|---|---|---|
| 16 | W16 | d | A | 210 | 0.11 | 0.26 | 0.81 | 1.99 | 1.16 | 0.42 |
| 17 | W17 | d | A | 210 | 0.08 | 0.18 | 0.93 | 2.20 | 1.03 | 0.47 |
| 18 | W18 | c | A | 200 | 0.13 | 0.19 | 0.90 | 2.38 | 0.96 | 0.36 |
| 19 | W19 | c | A | 230 | 0.11 | 0.33 | 0.85 | 2.67 | 0.94 | 0.39 |
| 20 | W20 | c | A | 220 | 0.10 | 0.31 | 1.02 | 2.21 | 1.05 | 0.41 |
| 21 | W21 | d | A | 240 | 0.05 | 0.18 | 0.74 | 2.27 | 1.02 | 0.38 |
| 22 | W22 | d | A | 210 | 0.11 | 0.31 | 1.05 | 1.99 | 0.93 | 0.36 |
| 23 | W23 | c | A | 210 | 0.10 | 0.17 | 1.04 | 2.23 | 0.86 | 0.35 |
| 24 | W24 | a | A | 210 | 0.11 | 0.16 | 1.09 | 2.08 | 1.00 | 0.34 |
| 25 | W25 | e | A | 210 | 0.11 | 0.15 | 1.00 | 2.09 | 1.00 | 0.33 |
| 26 | W26 | c | A | 180 | 0.11 | 0.17 | 1.06 | 2.06 | 1.04 | 0.33 |
| 27 | W27 | c | A | 260 | 0.09 | 0.16 | 1.08 | 2.07 | 1.02 | 0.35 |
| 28 | W28 | c | B | 210 | 0.10 | 0.17 | 0.95 | 2.12 | 1.03 | 0.34 |
| 29 | W29 | c | A | 210 | 0.11 | 0.17 | 1.08 | 2.64 | 1.02 | 0.38 |
| 30 | W30 | c | A | 210 | <u>0.04</u> | 0.19 | 0.96 | 2.40 | 1.08 | 0.38 |
| 31 | W31 | c | A | 220 | <u>0.16</u> | 0.19 | 0.98 | 1.22 | 0.91 | 0.33 |
| 32 | W32 | d | A | 200 | 0.11 | <u>0.51</u> | 0.56 | 2.19 | 1.03 | 0.35 |
| 33 | W33 | c | A | 200 | 0.11 | 0.18 | <u>1.32</u> | 2.27 | 1.02 | 0.35 |
| 34 | W34 | d | A | 200 | 0.11 | 0.18 | 0.98 | <u>3.06</u> | 1.25 | 0.40 |
| 35 | W35 | d | A | 210 | 0.09 | 0.19 | 1.12 | 2.41 | <u>0.76</u> | 0.41 |
| 36 | W36 | c | A | 200 | 0.10 | 0.20 | 1.08 | 2.07 | 0.82 | <u>0.24</u> |
| 37 | W37 | d | A | 210 | 0.09 | 0.28 | 1.08 | 2.25 | 0.93 | <u>0.52</u> |
| 38 | W38 | d | A | 200 | 0.11 | 0.19 | 1.05 | 2.44 | 1.00 | 0.35 |
| 39 | W39 | d | A | 210 | 0.12 | 0.36 | 1.09 | 2.57 | 1.05 | 0.35 |
| 40 | W40 | c | A | 210 | 0.12 | 0.10 | 1.03 | 2.07 | 1.02 | 0.33 |
| 41 | W41 | d | A | 220 | 0.09 | 0.19 | 1.04 | 2.30 | 0.92 | 0.31 |
| 42 | W42 | c | C | 200 | 0.12 | 0.15 | 1.05 | 2.21 | 1.00 | 0.33 |
| 43 | W43 | d | B | 190 | 0.06 | 0.15 | 0.85 | 2.22 | 1.00 | 0.33 |
| 44 | W44 | c | A | 200 | 0.10 | 0.16 | 1.03 | 2.07 | 1.01 | 0.34 |
| 45 | W45 | c | A | 200 | 0.09 | 0.15 | 1.02 | 2.05 | 0.99 | 0.35 |
| 46 | W46 | c | A | 200 | 0.10 | 0.15 | 1.00 | 2.04 | 1.01 | 0.34 |

| Experiment No. | Weld metal composition (mass %) Remainder: Fe and inevitable impurities | | | | | | | | | A value | Z value |
|---|---|---|---|---|---|---|---|---|---|---|---|
| | Nb | N | O | Cu | Ni | B | W | Al | Ti | | |
| 1 | 0.012 | 0.006 | 0.031 | — | — | — | — | — | — | 217 | 0.11 |
| 2 | 0.012 | 0.006 | 0.028 | — | — | — | — | — | — | 215 | 0.12 |
| 3 | 0.014 | 0.008 | 0.030 | 0.10 | — | — | — | — | — | 107 | 0.13 |
| 4 | 0.013 | 0.006 | 0.031 | 0.10 | — | 0.0006 | — | — | — | 214 | 0.11 |
| 5 | 0.016 | 0.006 | 0.029 | 0.10 | — | 0.0012 | — | — | — | 224 | 0.11 |
| 6 | 0.018 | 0.006 | 0.032 | — | 0.16 | 0.0007 | — | — | — | 221 | 0.15 |
| 7 | 0.016 | 0.006 | 0.031 | 0.04 | 0.20 | 0.0005 | 0.14 | — | — | 218 | 0.11 |
| 8 | 0.017 | 0.006 | 0.036 | 0.08 | 0.18 | 0.0018 | — | — | — | 202 | 0.10 |
| 9 | 0.024 | 0.006 | 0.008 | 0.10 | — | 0.0018 | — | — | — | 214 | 0.14 |
| 10 | 0.033 | 0.006 | 0.028 | 0.10 | — | 0.0006 | — | — | — | 206 | 0.16 |
| 11 | 0.016 | 0.005 | 0.024 | 0.10 | — | 0.0027 | — | — | — | 212 | 0.06 |
| 12 | 0.018 | 0.006 | 0.027 | 0.10 | — | 0.0007 | — | — | — | 239 | 0.08 |
| 13 | 0.016 | 0.006 | 0.027 | 0.09 | 0.72 | 0.0009 | — | — | — | 207 | 0.10 |
| 14 | 0.010 | 0.006 | 0.033 | 0.09 | — | 0.0004 | 0.35 | — | — | 228 | 0.10 |
| 15 | 0.042 | 0.006 | 0.030 | 0.10 | — | 0.0007 | — | — | — | 201 | 0.10 |
| 16 | 0.016 | 0.006 | 0.029 | 0.10 | 0.30 | 0.0012 | — | — | — | 205 | 0.09 |
| 17 | 0.018 | 0.006 | 0.030 | 0.10 | 0.25 | 0.0008 | — | — | — | 210 | 0.16 |
| 18 | 0.043 | 0.006 | 0.026 | 0.11 | — | 0.0009 | 0.26 | — | — | 219 | 0.14 |
| 19 | 0.035 | 0.022 | 0.028 | 0.10 | 0.19 | 0.0007 | — | 0.016 | — | 205 | 0.09 |
| 20 | 0.011 | 0.006 | 0.032 | 0.10 | 0.04 | 0.0007 | — | — | 0.007 | 206 | 0.08 |
| 21 | 0.016 | 0.011 | 0.030 | 0.10 | — | 0.0011 | — | — | 0.012 | 208 | 0.10 |
| 22 | 0.029 | 0.006 | 0.005 | 0.10 | 0.83 | — | — | — | — | 237 | 0.10 |
| 23 | 0.033 | 0.006 | 0.023 | 0.10 | — | 0.0008 | — | 0.022 | — | 235 | 0.10 |
| 24 | 0.013 | 0.006 | 0.003 | — | — | — | — | — | — | 219 | <u>0.03</u> |
| 25 | 0.012 | 0.006 | 0.002 | — | — | — | — | — | — | 218 | <u>0.04</u> |
| 26 | 0.012 | 0.006 | 0.004 | — | — | 0.0009 | — | — | — | 215 | <u>0.03</u> |
| 27 | 0.013 | 0.006 | 0.035 | — | — | 0.0008 | — | — | — | 217 | <u>0.04</u> |
| 28 | 0.013 | 0.006 | 0.031 | — | — | 0.0007 | — | — | — | 213 | <u>0.04</u> |
| 29 | 0.017 | 0.006 | 0.035 | 0.06 | 0.15 | 0.0018 | — | — | — | <u>198</u> | 0.10 |
| 30 | 0.015 | 0.006 | 0.042 | 0.10 | — | 0.0008 | — | — | — | <u>195</u> | 0.09 |
| 31 | 0.018 | 0.005 | 0.028 | 0.10 | — | — | — | — | — | 250 | 0.14 |
| 32 | 0.016 | 0.006 | 0.049 | 0.10 | — | 0.0009 | — | — | — | 211 | 0.08 |
| 33 | 0.018 | 0.006 | 0.031 | 0.10 | — | 0.0007 | — | — | — | 209 | 0.11 |
| 34 | 0.024 | 0.006 | 0.033 | 1.05 | — | 0.0008 | — | — | — | <u>164</u> | <u>0.04</u> |
| 35 | 0.017 | 0.006 | 0.028 | 0.10 | — | 0.0006 | — | 0.031 | — | 233 | 0.11 |
| 36 | 0.030 | 0.006 | 0.036 | 0.10 | — | 0.0053 | — | — | — | 254 | <u>0.04</u> |
| 37 | 0.015 | 0.006 | 0.031 | 0.10 | — | — | 0.53 | — | — | 218 | 0.13 |
| 38 | 0.053 | 0.006 | 0.032 | 0.10 | — | — | — | — | 0.021 | 215 | 0.10 |
| 39 | 0.006 | 0.006 | 0.018 | 0.10 | — | — | — | 0.022 | — | <u>191</u> | <u>0.04</u> |
| 40 | 0.013 | 0.006 | 0.031 | — | — | — | — | — | — | 217 | <u>0.04</u> |
| 41 | 0.015 | 0.006 | 0.034 | 0.10 | — | 0.0005 | — | — | — | 219 | <u>0.04</u> |
| 42 | 0.012 | 0.006 | 0.030 | 0.10 | — | — | — | — | — | 212 | <u>0.04</u> |
| 43 | 0.024 | 0.006 | 0.041 | 0.10 | — | 0.0018 | — | — | — | 216 | <u>0.04</u> |

TABLE 8-continued

| | | | | | | | | | | | | |
|---|---|---|---|---|---|---|---|---|---|---|---|---|
| 44 | 0.013 | 0.027 | 0.031 | — | — | — | — | — | — | — | 218 | 0.11 |
| 45 | 0.012 | 0.004 | <u>0.061</u> | — | — | — | — | — | — | — | 221 | 0.11 |
| 46 | 0.013 | 0.006 | 0.031 | — | <u>1.02</u> | — | — | — | — | — | 219 | 0.11 |

TABLE 9

| Experiment No. | Strength TS [MPa] | Toughness vTr$_{54}$ [° C.] | Toughness vTr'$_{54}$ [° C.] | Temper embrittlement resistance ΔvTr$_{54}$ [° C.] | SR crack resistance | Creep rupture properties Rupture time Tr [hr] |
|---|---|---|---|---|---|---|
| 1 | 629 | −58 | −57 | 1 | ○ | 1359 |
| 2 | 631 | −61 | −58 | 3 | ○ | 1624 |
| 3 | 641 | −80 | −57 | 3 | ○ | 1756 |
| 4 | 658 | −55 | −52 | 3 | ○ | 1422 |
| 5 | 645 | −61 | −57 | 4 | ○ | 1803 |
| 6 | 641 | −52 | −51 | 1 | ○ | 1256 |
| 7 | 665 | −53 | −51 | 2 | ○ | 1256 |
| 8 | 660 | −55 | −52 | 3 | ○ | 1152 |
| 9 | 618 | −59 | −57 | 2 | ○ | 1507 |
| 10 | 689 | −51 | −50 | 1 | ○ | 1920 |
| 11 | 617 | −57 | −52 | 5 | ○ | 1188 |
| 12 | 657 | −52 | −51 | 1 | ○ | 1231 |
| 13 | 675 | −55 | −50 | 5 | ○ | 1231 |
| 14 | 678 | −51 | −50 | 1 | ○ | 1532 |
| 15 | 693 | −50 | −50 | 0 | ○ | 1193 |
| 16 | 662 | −54 | −50 | 4 | ○ | 1386 |
| 17 | 671 | −51 | −51 | 0 | ○ | 1584 |
| 18 | 689 | −51 | −50 | 1 | ○ | 2053 |
| 19 | 671 | −52 | −50 | 2 | ○ | 1411 |
| 20 | 615 | −51 | −51 | 0 | ○ | 1049 |
| 21 | 621 | −62 | −59 | 3 | ○ | 1322 |
| 22 | 672 | −52 | −51 | 1 | ○ | 1351 |
| 23 | 618 | −52 | −50 | 2 | ○ | 1896 |
| 24 | 654 | −58 | −51 | <u>7</u> | ○ | <u>803</u> |
| 25 | 623 | −57 | −51 | <u>6</u> | ○ | <u>905</u> |
| 26 | 643 | −59 | −51 | <u>8</u> | ○ | <u>825</u> |
| 27 | 628 | −60 | −52 | <u>8</u> | ○ | <u>766</u> |
| 28 | 637 | −58 | −51 | <u>7</u> | ○ | <u>940</u> |
| 29 | 661 | −55 | −51 | 4 | ○ | <u>962</u> |
| 30 | <u>592</u> | −61 | −59 | 2 | ○ | <u>693</u> |
| 31 | 703 | <u>−32</u> | <u>−28</u> | 4 | X | 1628 |
| 32 | <u>591</u> | <u>−46</u> | <u>−44</u> | 2 | X | 1028 |
| 33 | 665 | −53 | <u>−42</u> | <u>11</u> | ○ | 1207 |
| 34 | 731 | <u>−29</u> | <u>−16</u> | <u>13</u> | ○ | <u>944</u> |
| 35 | <u>594</u> | <u>−34</u> | <u>−30</u> | 4 | ○ | <u>996</u> |
| 36 | 607 | −54 | <u>−39</u> | <u>15</u> | X | <u>882</u> |
| 37 | 687 | <u>−38</u> | <u>−36</u> | 2 | ○ | 1542 |
| 38 | 671 | <u>−38</u> | <u>−35</u> | 3 | X | 1338 |
| 39 | <u>584</u> | <u>−49</u> | <u>−40</u> | <u>9</u> | ○ | <u>710</u> |
| 40 | 630 | −58 | −50 | <u>8</u> | ○ | <u>871</u> |
| 41 | 623 | −57 | −51 | <u>6</u> | ○ | <u>962</u> |
| 42 | 644 | −56 | −50 | <u>6</u> | ○ | 1820 |
| 43 | 617 | −57 | −59 | 0 | ○ | <u>944</u> |
| 44 | 693 | <u>−45</u> | <u>−41</u> | 4 | ○ | 1321 |
| 45 | 633 | <u>−48</u> | <u>−44</u> | 4 | ○ | 1243 |
| 46 | 690 | <u>−47</u> | <u>−44</u> | 3 | ○ | 1224 |

[Shielded Metal Arc Welding (SMAW)]

As shown in Tables 6 and 7, Nos. 1 to 22 satisfied the scope of the invention, and showed good results in all evaluation items.

On the other hand, Nos. 23 to 44 did not satisfy the scope of the invention, and showed the following results.

Nos. 23 to 28 each had the Z value that was below the lower limit, and were each bad in temper embrittlement resistance and/or creep rupture properties. No. 29 had the A value that was below the lower limit, and was bad in creep rupture properties. No. 30 had the C content that was below the lower limit and the O content that exceeded the upper limit, and was bad in strength, toughness, and creep rupture properties. No. 31 had the C content, the Mn content, and the Mo content, which each exceeded the upper limit, and had the A value that was below the lower limit, and was therefore bad in toughness, temper embrittlement resistance, and creep rupture properties. No. 32 had the Si content that exceeded the upper limit and the Cr content and the O content, which were each below the lower limit, and was bad in toughness and SR crack resistance.

No. 33 had the Mn content and the V content, which were each below the lower limit, the Al content that exceeded the upper limit, and had the Z value that was below the lower limit, and was therefore bad in strength, toughness, temper embrittlement resistance, SR crack resistance, and creep rupture properties. No. 34 had the Cr content, the W content, and the Ti content, which each exceeded the upper limit, and had the A value that was below the lower limit, and was therefore bad in toughness, SR crack resistance, and creep rupture properties. No. 35 had the Mo content that was below the lower limit, and was bad in strength and creep rupture properties. In some case, low strength results in degradation in creep rupture properties. The comparative example No. 35 corresponds to such a case. No. 36 had the V content and the B content, which each exceeded the upper limit, and was bad in toughness and SR crack resistance.

No. 37 had the Nb content that was below the lower limit, and was bad in strength and creep rupture properties. In some case, low strength results in degradation in creep rupture properties. The comparative example No. 37 corresponds to such a case. No. 38 had the Nb content that exceeded the upper limit, and was bad in toughness. No. 39 had the N content that exceeded the upper limit, and was bad in toughness. No. 40 had the Cu content that exceeded the upper limit, and was bad in toughness. No. 41 had the Ni content that exceeded the upper limit, and was bad in toughness. Nos. 42 to 44 each had the Z value that was below the lower limit, and were each bad in temper embrittlement resistance and/or creep rupture properties.

[Submerge Arc Welding (SAW)]

As shown in Tables 8 and 9, Nos. 1 to 23 satisfied the scope of the invention, and showed good results in all evaluation items.

On the other hand, Nos. 24 to 46 did not satisfy the scope of the invention, and showed the following results.

Nos. 24 to 28 each had the Z value that was below the lower limit, and were each bad in temper embrittlement resistance and creep rupture properties. No. 29 had the A value that was below the lower limit, and was bad in creep rupture properties. No. 30 had the C content that was below the lower limit, and had the A value that was below the lower limit, and was therefore bad in strength and creep rupture properties. No. 31 had the C content that exceeded the upper limit and the Cr content that was below the lower limit, and was bad in toughness and SR crack resistance.

No. 32 had the Si content that exceeded the upper limit and the Mn content that was below the lower limit, and was bad in strength, toughness, and SR crack resistance. No. 33 had the Mn content that exceeded the upper limit, and was bad in toughness and temper embrittlement resistance. In the comparative example No. 33, temper embrittlement resistance was degraded, and resultantly toughness did not satisfy the predetermined value after step cooling. No. 34 had the Cr content, the Mo content, and the Cu content, which each exceeded the upper limit, and had the A value and the Z value that were each below the lower limit, and was therefore bad in toughness, temper embrittlement resistance, and creep rupture properties. No. 35 had the Mo content that was below the lower limit and the Al content that exceeded the upper limit, and was bad in strength, toughness, and creep rupture properties. In some case, low strength results in degradation in creep rupture properties. The comparative example No. 35 corresponds to such a case.

No. 36 had the V content that was below the lower limit, the B content that exceeded the upper limit, and had the Z value that was below the lower limit, and was therefore bad in toughness, temper embrittlement resistance, SR crack resistance, and creep rupture properties. In the comparative example No. 36, temper embrittlement resistance was degraded, and resultantly toughness did not satisfy the predetermined value after step cooling. No. 37 had the V content and the W content, which each exceeded the upper limit, and was bad in toughness. No. 38 had the Nb content and the Ti content, which each exceeded the upper limit, and was bad in toughness and SR crack resistance. No. 39 had the Nb content and the O content, which were each below the lower limit, and had the A value and the Z value that were each below the lower limit, and was therefore bad in strength, toughness, temper embrittlement resistance, and creep rupture properties. Nos. 40 and 41 each had the Z value that was below the lower limit, and were each bad in temper embrittlement resistance and creep rupture properties.

No. 42 had the Z value that was below the lower limit, and was bad in temper embrittlement resistance. No. 43 had the Z value that was below the lower limit, and was bad in creep rupture properties. No. 44 had the N content that exceeded the upper limit, and was bad in toughness. No. 45 had the O content that exceeded the upper limit, and was bad in toughness. No. 46 had the Ni content that exceeded the upper limit, and was bad in toughness.

The samples Nos. 42 and 43 were prepared to simulate the existing weld metals described in PTL 6 and PTL 7, respectively. As shown in this example, such existing weld metals each do not satisfy a certain level in at least one of the evaluation items. Consequently, this example has objectively demonstrated that the weld metal according to the invention is better than the existing weld metals.

Although the invention has been described in detail with the embodiment and the example hereinbefore, the gist of the invention is not limited to the above-described matter, and the scope of the rights of the invention must be widely interpreted based on the description of claims. It will be appreciated that the subject matter of the invention can be widely modified or altered based on the above-described description.

The present application is based on Japanese patent application (JP-2013-019560) filed on Feb. 4, 2013, the content of which is hereby incorporated by reference.

INDUSTRIAL APPLICABILITY

According to the invention, a weld metal used under environment of high temperature and pressure, such as environment in a boiler or a chemical reaction container, and a welded structure including the weld metal each stably have temper embrittlement resistance, creep rupture properties, strength, toughness, and SR crack resistance even at a welding condition with large heat input.

The invention claimed is:
1. A weld metal, comprising:
C: 0.05 to 0.15 mass %;
Si: 0.10 to 0.50 mass %;
Mn: 0.60 to 1.30 mass %;
Cr: 1.80 to 3.00 mass %;
Mo: 0.80 to 1.20 mass %;
V: 0.25 to 0.50 mass %;
Nb: 0.010 to 0.050 mass %;
N: greater than 0 up to 0.025 mass %; and
O: 0.020 to 0.060 mass %,
one or both of Cu: greater than 0 up to 1.00 mass % and Ni: greater than 0 up to 1.00 mass %,
Fe and inevitable impurities,
wherein an A value satisfies 200 or more, the A value being obtained by a composition of the weld metal according to a formula

$$A \text{ value} = ([V]/51 + [Nb]/93) / \{[V] \times ([Cr]/5 + [Mo]/2)\} \times 10^4$$

and
wherein a Z value is 0.05 or more, the Z value being obtained according to a formula $$Z \text{ value} = N \times [\text{insol. V}],$$

where N is number density (particles/μm) of carbide particles per unit grain boundary, the carbide particles existing in a prior austenite grain boundary of a stress-relief annealed weld metal, and [insol. V] is concentration of compound-type V determined by an extraction residue of the stress-relief annealed weld metal.

2. The weld metal according to claim 1, further comprising other elements including at least one of the groups (b) and (c):
(b) B: 0.0050 mass % or less (not including 0 mass %); and
(c) one or more of W: 0.50 mass % or less (not including 0 mass %), Al: 0.030 mass % or less (not including 0 mass %), and Ti: 0.020 mass % or less (not including 0 mass %).

3. A welded structure, comprising the weld metal according to claim 1.

4. The weld material according to claim 1, comprising
C: 0.07 to 0.13 mass %;
Si: 0.15 to 0.40 mass %;
Mn: 0.70 to 1.20 mass %;
Cr: 1.90 to 2.80 mass %;
Mo: 0.90 to 1.15 mass %;
V: 0.27 to 0.45 mass %;
Nb: 0.012 to 0.040 mass %;
N: more than 0 to 0.020 mass %; and
O: 0.025 to 0.050 mass %.

5. The weld material according to claim 4, comprising Mn: 0.75 to 1.15 mass %.

6. The weld material according to claim 4, comprising Cr: 2.00 to 2.60 mass %.

7. The weld material according to claim 4, comprising Mo: 0.90 to 1.10 mass %.

8. The weld material according to claim 4, comprising V: 0.30 to 0.40 mass %.

9. The weld material according to claim 4, comprising Nb: 0.012 to 0.035 mass %.

10. The weld material according to claim 1, wherein the inevitable impurities are P: 0.020 mass % or less, Sn: 0.010 mass % or less, and As: 0.010 mass % or less.

11. The weld material according to claim 1, wherein the A value is from 202 to 270.

12. The weld material according to claim 1, wherein the A value is from 205 to 250.

13. The weld material according to claim 1, wherein the Z value is from 0.07 to 0.20.

14. The weld material according to claim 1, comprising Cu and Ni in a total amount of 0.05 to 1.50 mass %.

15. The weld material according to claim 1, comprising B in amount of greater than 0 and not more than 0.0050 mass %.

16. The weld material according to claim 1, comprising W in an amount of greater than 0 and not more than 0.50 mass %.

17. The weld material according to claim 1, comprising Al in an amount of greater than 0 and not more than 0.030 mass %.

18. The weld material according to claim 1, comprising Ti in an amount of greater than 0 and not more than 0.020 mass %.

* * * * *